US012196082B2

(12) United States Patent
Wright et al.

(10) Patent No.: US 12,196,082 B2
(45) **Date of Patent: *Jan. 14, 2025**

(54) SYSTEMS AND METHODS FOR NON-CONTACT BORING

(71) Applicant: Phoenix Boring, Inc., San Francisco, CA (US)

(72) Inventors: Ian Wright, Woodside, CA (US); Arielle Dobrowolski, Richmond, CA (US); Matthew James Wright, West Lafeyette, IN (US); Shivani Torres, San Francisco, CA (US)

(73) Assignee: Phoenix Boring, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,988

(22) Filed: May 4, 2023

(65) Prior Publication Data

US 2023/0304401 A1 Sep. 28, 2023

Related U.S. Application Data

(63) Continuation of application No. 17/938,432, filed on Oct. 6, 2022, now Pat. No. 11,680,485, which is a (Continued)

(51) Int. Cl.

| | |
|---|---|
| ***E21C 37/16*** | (2006.01) |
| ***E21C 29/22*** | (2006.01) |
| ***E21D 9/10*** | (2006.01) |

(52) U.S. Cl.

CPC .............. *E21C 37/16* (2013.01); *E21C 29/22* (2013.01); *E21D 9/1073* (2013.01); *F05D 2220/30* (2013.01); *F05D 2240/35* (2013.01)

(58) Field of Classification Search

CPC ...... E21C 37/16; E21C 29/22; F05D 2220/30; F05D 2240/35

See application file for complete search history.

(56) References Cited

U.S. PATENT DOCUMENTS

| | | |
|---|---|---|
| 2,018,926 A | 10/1935 | Schroepfer |
| 2,939,310 A | 6/1960 | Cotton et al. |

(Continued)

FOREIGN PATENT DOCUMENTS

| | | |
|---|---|---|
| WO | 2022026835 A2 | 2/2022 |

OTHER PUBLICATIONS

U.S. Appl. No. 17/390,006, Notice of Allowance mailed Jul. 7, 2022, 10 pgs.

(Continued)

*Primary Examiner* — Janine M Kreck

(74) *Attorney, Agent, or Firm* — Polygon IP, LLP

(57) ABSTRACT

Disclosed are systems and methods to bore or tunnel through various geologies in an autonomous or substantially autonomous manner including one or more non-contact boring elements that direct energy at the bore face to remove material from the bore face through the fracture, spallation, and removal of the material. Systems can automatically execute methods to control a set of boring parameters that affect the flux of energy directed at the bore face. Systems can further automatically execute the methods to: monitor, direct, maintain, and/or adjust a set of boring controls, including for example a standoff distance between the system and the bore face, a temperature of exhaust gases directed at the bore face, a removal rate of material from the bore face, and/or a thermal or topological characterization of the bore face during boring operations.

20 Claims, 6 Drawing Sheets

Related U.S. Application Data continuation of application No. 17/390,006, filed on Jul. 30, 2021, now Pat. No. 11,492,904.

(60) Provisional application No. 63/151,036, filed on Feb. 18, 2021, provisional application No. 63/059,927, filed on Jul. 31, 2020.

(56) References Cited

U.S. PATENT DOCUMENTS

| | | | | |
|---|---|---|---|---|
| 3,426,175 | A | 2/1969 | Hahne | |
| 3,475,055 | A | 10/1969 | Snedden | |
| 3,788,703 | A | 1/1974 | Thorpe | |
| 4,073,351 | A | 2/1978 | Baum | |
| 9,539,664 | B2 | 1/2017 | Fagan | |
| 11,492,904 | B2 * | 11/2022 | Wright | E21D 9/1073 |
| 11,680,485 | B2 * | 6/2023 | Wright | E21C 29/22 299/14 |
| 2004/0100140 | A1 | 5/2004 | Brisebois | |
| 2005/0051523 | A1 | 3/2005 | Legge et al. | |
| 2011/0120771 | A1 | 5/2011 | Montaron | |
| 2014/0056646 | A1 | 2/2014 | Aulisio et al. | |
| 2017/0217013 | A1 | 8/2017 | Iqtidar et al. | |
| 2020/0156170 | A1 | 5/2020 | Lindsay et al. | |
| 2020/0217199 | A1 | 7/2020 | Helming | |
| 2022/0056800 | A1 | 2/2022 | Wright et al. | |
| 2023/0040350 | A1 | 2/2023 | Wright | |

OTHER PUBLICATIONS

U.S. Appl. No. 17/390,006, Restriction Requirement mailed Apr. 26, 2022, 7 pgs.

U.S. Appl. No. 17/938,432, Non Final Office Action mailed Feb. 1, 2023, 12 pgs.

U.S. Appl. No. 17/938,432, Notice of Allowance mailed Feb. 23, 2023, 5 pgs.

International Application Serial No. PCT/US21/43910, Preliminary Report on Patentability mailed Feb. 9, 2023, 21 pgs.

International Application Serial No. PCT/US21/43910, Search Report and Written Opinion dated Jan. 20, 2022, 25 pages.

* cited by examiner

SYSTEMS AND METHODS FOR NON-CONTACT BORING

CROSS-REFERENCE TO RELATED APPLICATIONS

This application is a continuation of U.S. application Ser. No. 17/938,432, filed on 2022 Oct. 6, which is a continuation of U.S. application Ser. No. 17/390,006, filed on 2021 Jul. 30 and granted as U.S. Pat. No. 11,492,904 on 2022 Nov. 8, which claims the benefit of U.S. Provisional Application No. 63/059,927, filed on 2020 Jul. 31, and also claims the benefit of U.S. Provisional Application No. 63/151,036 filed on 2021 Feb. 18, all of which incorporated herein in their entirety by this reference and for all purposes.

TECHNICAL FIELD

This disclosure relates generally to the field of underground boring and more specifically to new and useful methods for underground boring with new and useful non-contact boring systems in the field of underground boring.

DESCRIPTION OF THE EMBODIMENTS

The following description of embodiments of the disclosure is not intended to limit the disclosure to these embodiments but rather to enable a person skilled in the art to make and use this disclosure. Variations, configurations, implementations, example implementations, and examples described herein are optional and are not exclusive to the variations, configurations, implementations, example implementations, and examples they describe. The disclosure described herein can include any and all permutations of these variations, configurations, implementations, example implementations, and examples.

Methods

Figure 1:
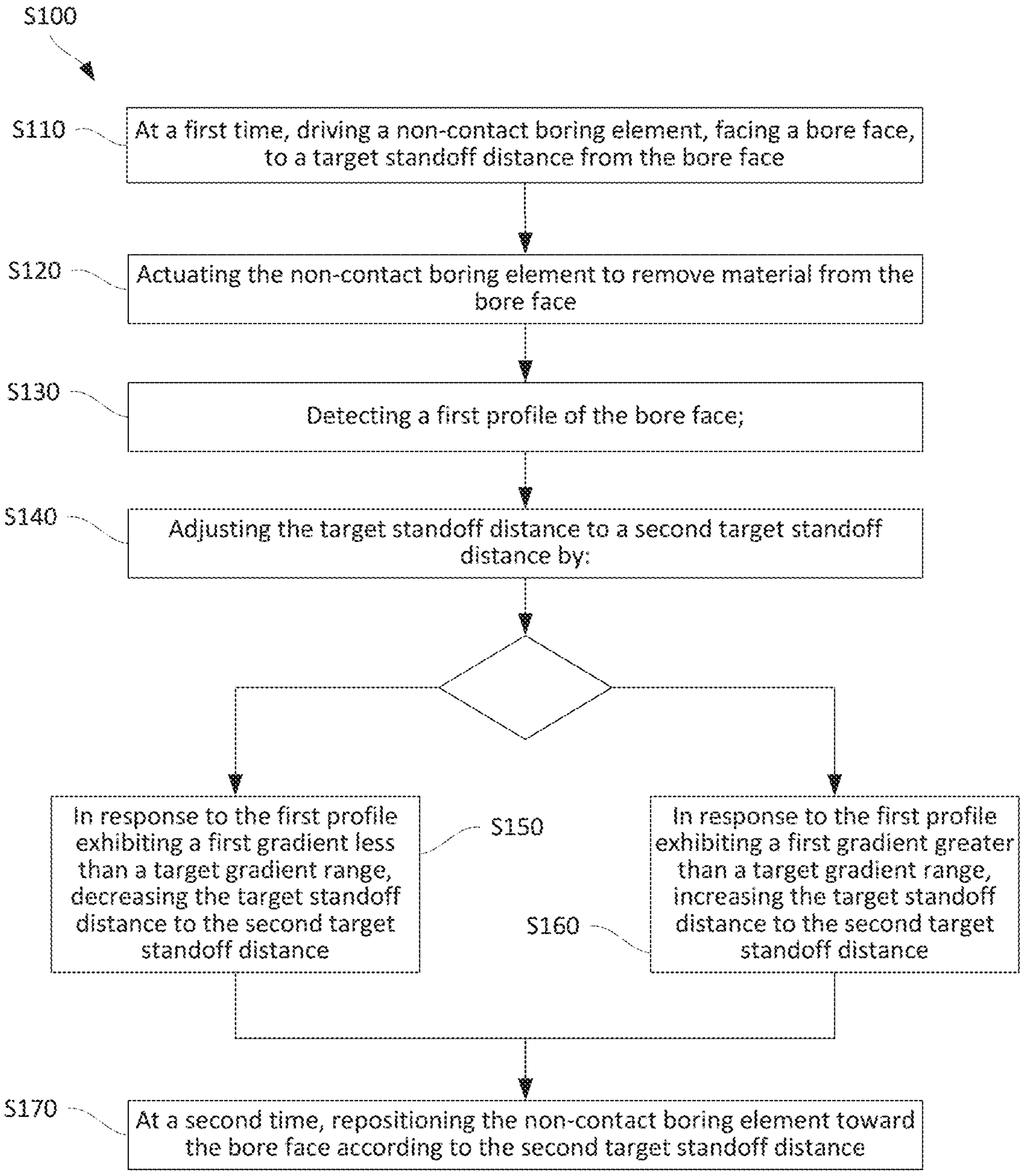
FIG. 1 is a flow diagram of an example implementation for boring with a non-contact boring element.

As shown in FIG. 1, a method S100 for boring can include: at a first time, driving a non-contact boring element, facing a bore face, to a target standoff distance from the bore face in Block S110; actuating the non-contact boring element to remove material from the bore face in Block S120; detecting a first profile of the bore face in Block S130; and adjusting the target standoff distance to a second target standoff distance in Block S140. As shown in FIG. 1, the method S100 can include: in response to the first profile exhibiting a first gradient less than a target gradient range, decreasing the target standoff distance to the second target standoff distance in Block S150; or, in response to the first profile exhibiting the first gradient greater than the target gradient range, increasing the target standoff distance to the second target standoff distance in Block S160. The method S100 can also include at a second time, repositioning the non-contact boring element toward the bore face according to the second target standoff distance in Block S170.

Figure 3:
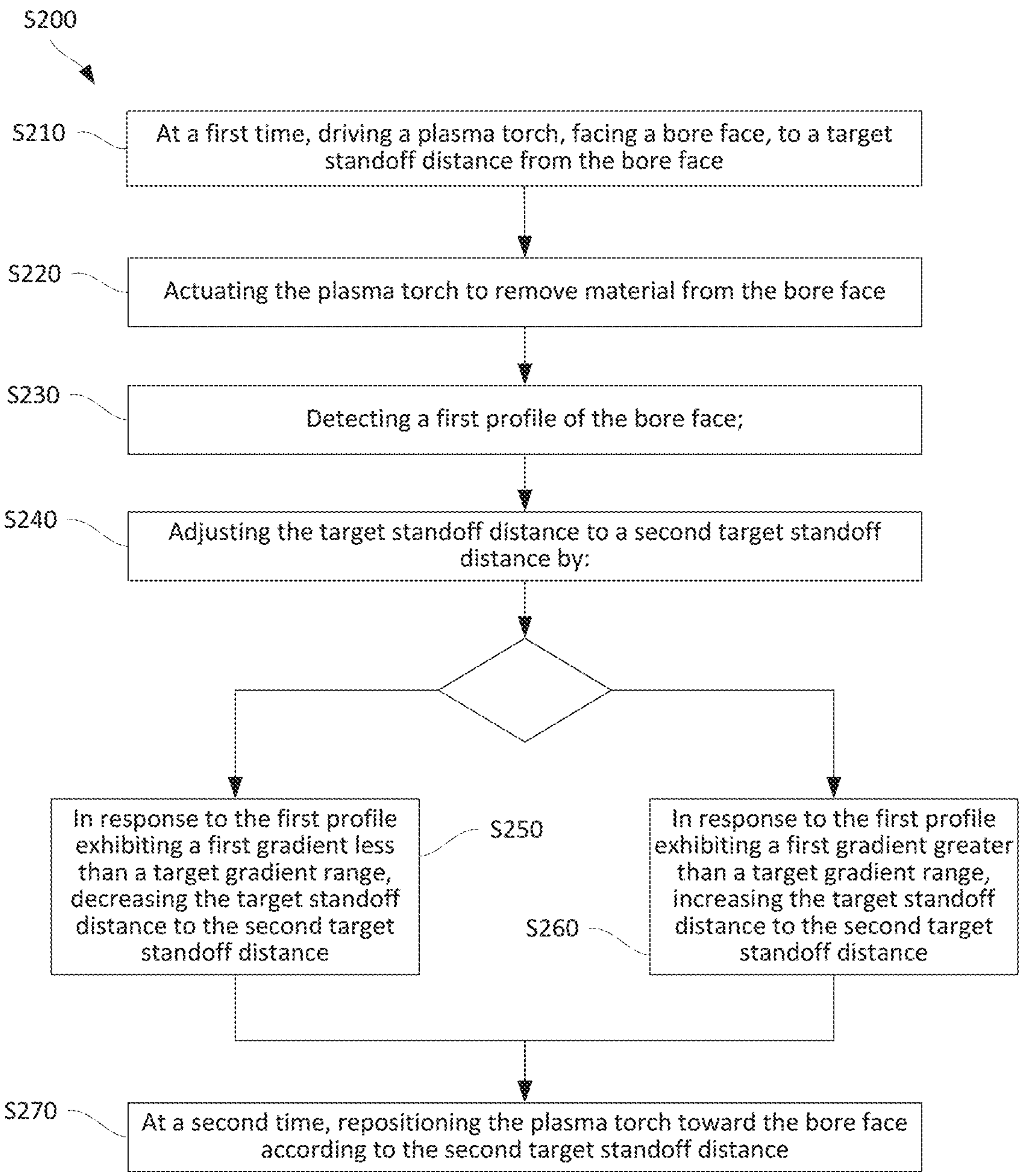
FIG. 3 is a flow diagram of an example implementation of a method for boring with a plasma torch.

As shown in FIG. 3, a second method S200 for boring with plasma can include: at a first time, driving a plasma torch, facing a bore face, to a target standoff distance from the bore face in Block S210; actuating the plasma torch to remove material from the bore face in Block S220; detecting a first profile of the bore face in Block S230; and adjusting the target standoff distance to a second target standoff distance in Block S240. As shown in FIG. 3, the method S200 can include, in response to the first profile exhibiting a first gradient less than a target gradient range, decreasing the target standoff distance to the second target standoff distance in Block S250; or, in response to the first profile exhibiting the first gradient greater than the target gradient range, increasing the target standoff distance to the second target standoff distance in Block S260. The method S200 can also include: at a second time, repositioning the plasma torch toward the bore face according to the second target standoff distance in Block S270.

Figure 5:
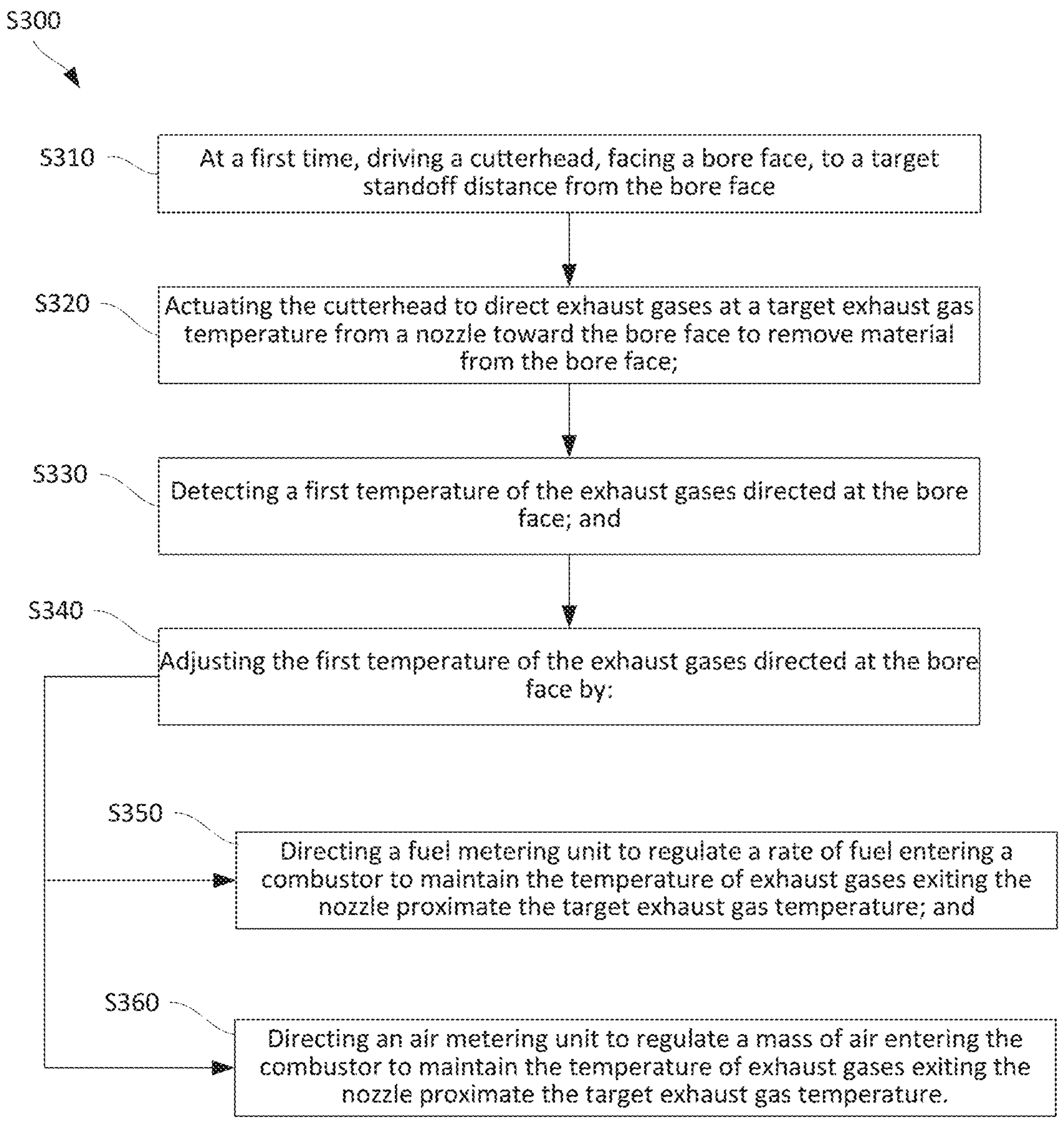
FIG. 5 is a flow diagram of an example implementation of a method for boring with a cutterhead including a jet engine.

As shown in FIG. 5, a third method S300 for boring with a cutterhead including a jet engine can include: at a first time, driving a cutterhead, facing a bore face to a target standoff distance from the bore face in Block S310; actuating the cutterhead to direct exhaust gases at a target exhaust gas temperature from a nozzle toward the bore face to remove material from the bore face in Block S320; detecting a first temperature of the exhaust gases directed at the bore face in Block S330; and adjusting the first temperature of the exhaust gases directed at the bore face in Block S340. As shown in FIG. 5 the method S300 can also include: directing a fuel metering unit to regulate a rate of fuel entering a combustor to maintain the temperature of exhaust gases exiting the nozzle proximate the target exhaust gas temperature in Block S350; and directing an air metering unit to regulate a mass of air entering the combustor to maintain the temperature of exhaust gases existing the nozzle at or near the target exhaust gas temperature in Block S360.

Variation of the methods S100, S200, S300 can include: at a first time, driving a non-contact boring element, facing a bore face, to target standoff distance from the bore face; actuating the non-contact boring element to remove material from the bore face; detecting a first standoff distance from the non-contact boring element to the bore face; calculating a first removal rate from the bore face based on a first difference between the target standoff distance at the first time and the first standoff distance; in response to the first removal rate falling below a target removal rate, increasing the target standoff distance; at a second time succeeding the first time, driving the non-contact boring element to the target standoff distance; actuating the non-contact boring element to remove material from the bore face; detecting a second standoff distance from the non-contact boring element to the bore face; calculating a second removal rate from the bore face based on a second difference between the target standoff distance at the second time and the second standoff distance; and, in response to the second removal rate falling below the first removal rate, decreasing the target standoff distance.

Systems

Figure 2:
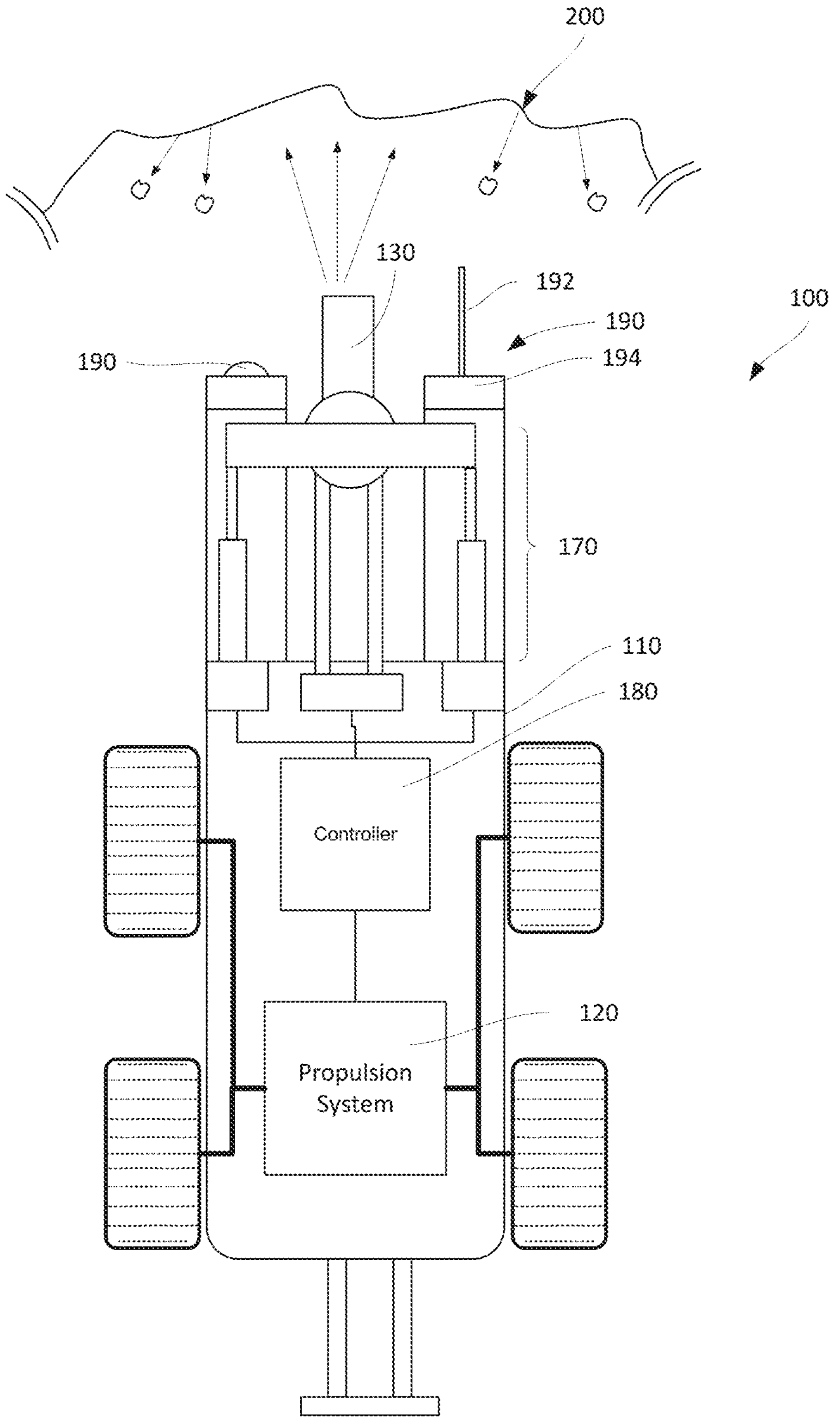
FIG. 2 is a schematic representation of an example implementation of a system for boring with a non-contact boring element.

As shown in FIG. 2, a system 100 for non-contact boring can include: a chassis 110; a propulsion system 120 arranged with the chassis 110 to advance the chassis 110 in a first direction toward a bore face 200 and retract the chassis 110 in a second direction away from the bore face; a non-contact boring element 130 connected to the chassis 110 and configured to operate in response to a set of boring parameters; and a depth sensor 190 configured to measure a standoff distance between the chassis 110 and the bore face 200. The system 100 can also include a controller 180 connected to the propulsion system 120, the non-contact boring element 130, and the depth sensor 190 and configured to control the propulsion system 120, the non-contact boring element 130, and the depth sensor 190 in response to the depth sensor 190 measuring the standoff distance between the chassis 110 and the bore face 200.

Figure 4A:
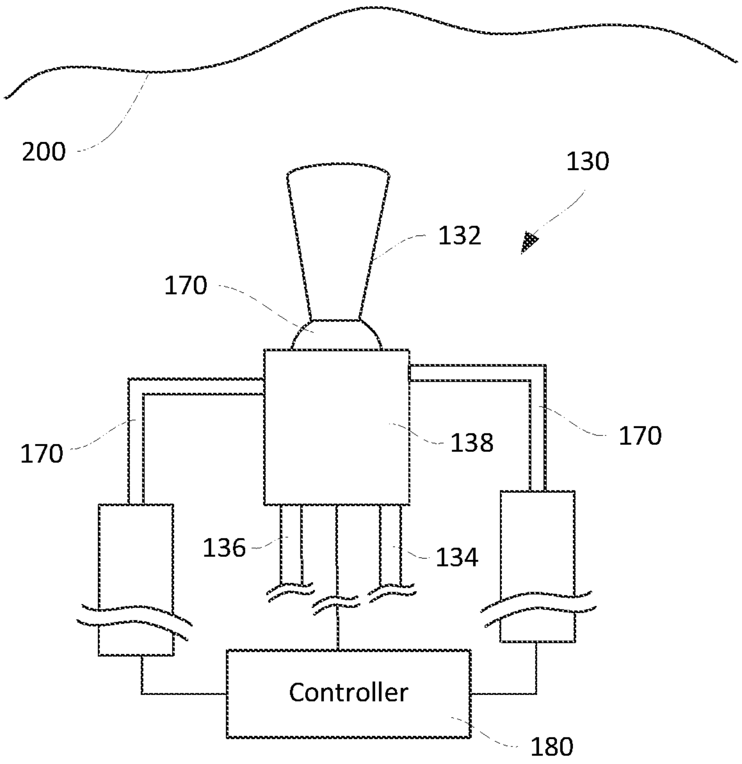
FIG. 4A is a schematic representation of an example implementation of a system for boring with a plasma torch.
Figure 4B:
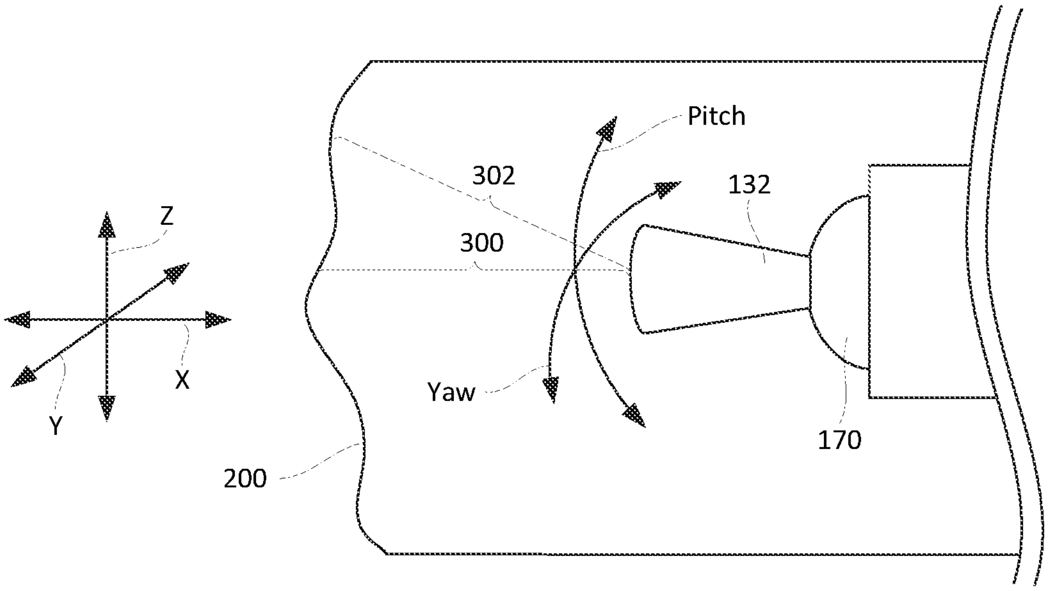
FIG. 4B is a schematic representation of an example implementation of a system for boring with a plasma torch.

In one variation of the system 100 shown in FIGS. 4A and 4B, the system 100 can include: a chassis 110; a propulsion system 120 arranged with the chassis 110 to advance the chassis 110 in a first direction toward a bore face 200 and retract the chassis 110 in a second direction away from the bore face 200; a plasma torch 132 connected to a power supply 134 and a gas supply 136; and a plasma torch ram 170 connecting the plasma torch 132 to the chassis 110. As shown in FIGS. 4A and 4B, the plasma torch ram 170 can be configured to: locate the plasma torch 132 on the chassis 110; advance and retract the plasma torch 132 along the chassis 110 along a longitudinal axis (X-axis) substantially parallel to the first direction and the second direction; tilt the plasma torch 132 along a pitch angle relative to the longitudinal axis and a yaw angle relative to the longitudinal axis; lift the plasma torch 132 vertically along a vertical axis (Z axis) substantially perpendicular to the longitudinal axis; and shift the plasma torch 132 laterally along a horizontal axis substantially perpendicular to the longitudinal axis and the vertical axis. As shown in FIGS. 2, 4A, and 4B, the system 100 can also include a depth sensor 190 configured to measure a standoff distance between the chassis 110 and the bore face 200; and a spoil evacuator configured to draw waste from a first location between the chassis 110 and the bore face 200 to a second location. In this variation of the exemplary implementation, the system 100 can also include a controller 180 connected to the propulsion system 120, the plasma torch 132, the plasma torch ram 170, and the depth sensor 190 and configured to drive the propulsion system 120, the plasma torch 132, the plasma torch ram 170, and the depth sensor 190 in response to the depth sensor 190 measuring the standoff distance between the chassis 110 and the bore face 200.

Figure 6:
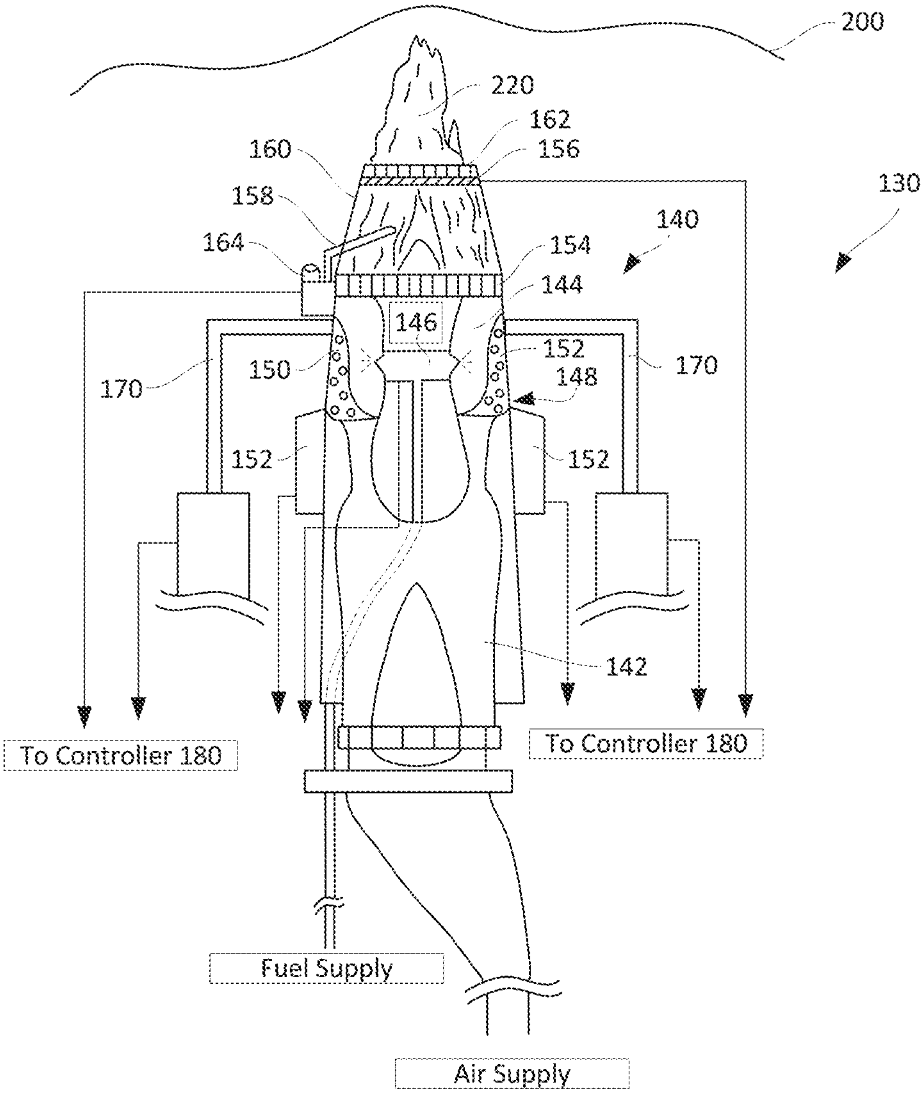
FIG. 6 is a schematic representation of an example implementation of a system for boring with a cutterhead including a jet engine.

In another variation of the system 100 shown in FIG. 6, the system 100 can include a chassis 110, and a cutterhead 140 including: a compressor 142 configured to compress air inbound from an above-ground fresh air supply; a combustor 144 configured to mix compressed air exiting the compressor 142 with a fuel inbound from an above-ground fuel supply and to ignite the fuel; a turbine 154 configured to extract energy from combusted fuel and compressed air exiting the combustor 144 to rotate the compressor 142; and a nozzle 160 configured to direct exhaust gases 220 exiting the turbine 154 to induce an area of jet impingement at a bore face 200. As shown in FIG. 6, the system 100 can also include a cutterhead ram 170 connected to the cutterhead 140 and configured to position the cutterhead 140 relative to the bore face 200; a temperature sensor 156; and a controller 180 connected to the cutterhead 140, the temperature sensor 156, and the cutterhead ram 170. In this variation of the system 100 of the example implementation, the controller 180 can be configured to: track a temperature of exhaust gases 220 exiting the nozzle 160 based on a signal output by the temperature sensor 156; and to regulate a rate of fuel entering the combustor 144 to maintain the temperature of exhaust gases 220 exiting the nozzle 160 below a melting temperature and above a spallation temperature of a geology present in the bore. As shown in FIGS. 2 and 6, the system 100 can also include a propulsion system 120 connected to the controller 180 and arranged with the chassis 110 to advance the chassis in a first direction toward a bore face 200 and retract the chassis 110 in a second direction away from the bore face 200.

Applications

Generally, one or more variations of the system 100 can execute Blocks of the methods S100, S200, S300 to bore or tunnel through various geologies in an autonomous or substantially autonomous manner while increasing efficiencies in boring rate and power (fuel, electricity, combustible gases) consumption. Generally, the system 100 can include one or more non-contact boring elements that direct energy (e.g., through high temperatures, pressures, electromagnetic radiation, etc.) at the bore face to remove material from the bore face through fracture, spallation, and removal of the material. In order to operate in an autonomous or substantially autonomous manner, the system 100 can automatically execute Blocks of the methods S100, S200, S300 to control a set of boring parameters (electrical power, gas flow, air flow, fuel flow, etc.) that affect the flux of energy directed at the bore face. Moreover, the system 100 can automatically execute Blocks of the methods S100, S200, S300 to: monitor, direct, maintain, and/or adjust a set of boring controls, including for example a standoff distance between the system 100 and the bore face, a temperature of exhaust gases directed at the bore face, a removal rate of material from the bore face, and/or a thermal or topological characterization of the bore face during boring operations. Applications of example implementations of a non-contact boring system 100 are described below with reference to the FIGURES.

Applications: Plasma Boring Variation

Generally, the methods S100 and S200 can be executed by a plasma boring system 100 (hereinafter the "system 100") during a plasma boring operation to modulate plasma torch power, gas flow rate, orientation, advance rate, and standoff distance as a function of bore shape (or "profile") and material removal rate from the bore face in order to maintain a bore geometry and efficient boring. More specifically, the system 100 can execute Blocks of the methods S100 and S200 to: track actual standoff distance from the plasma torch to the bore face; implement closed-loop controls to maintain actual standoff distance at a target standoff distance; characterize boring efficacy based on differences between actual and predicted standoff distance as a function of power and gas flow rate input to the plasma torch; derive a bore face profile based on standoff distances at various positions across the bore face; modify the target standoff distance and plasma torch orientation to increase boring efficiency and maintain a target bore face profile across the bore face; and to modulate power and gas flow rate to the plasma torch to maintain high boring efficiency given the target standoff distance and plasma torch orientation over time throughout a boring operation.

For example, the system 100 can: monitor the bore face profile (or "shape") of the bore based on standoff distances measured by the system 100 across the bore face; and then increase the target standoff distance if the bore profile exhibits a high gradient (e.g., is steep, is highly concave) or decrease the target standoff distance if the bore profile exhibits a low gradient (e.g., is shallow, is minimally concave, exhibits local convexity). The system 100 can also increase gas flow rate and power to the plasma torch and/or slow an advance (or "feed") rate of the plasma torch responsive to detecting a narrow bore cross-section in order to widen the bore; and decrease gas flow rate and power to the plasma torch and/or slow an advance rate of the plasma torch responsive to detecting a broad bore cross-section in order to maintain a desired bore width or reduce the size of the cross section of the bore. Furthermore, the system 100 can orient (or "tilt") the plasma torch toward a region of the bore face nearest the leading end of the system 100—which may exhibit low removal rate at current operating parameters of the system 100 due to a change in geology—and adjust power and/or gas flow rate to the torch to preferentially remove material from this region of the bore face.

Therefore, by monitoring a single standoff distance between the torch and the bore face, the system 100 can: track material removal rate from the bore face; adjust target standoff distance based on this removal rate; and adjust power and gas flow to the plasma torch to compensate for this target standoff distance and thus maintain high removal rate from the bore face. Furthermore, by monitoring multiple standoff distances between the system 100 and regions across the bore face, the system 100 can: characterize a profile of the bore face; adjust target standoff, power, and gas flow rates to maintain a target shape of the bore; detect low-yield (or high-resilience) regions across the bore face; and adjust plasma torch orientation, target standoff, power, and gas flow rates to preferentially target removal of material from such low-yield regions.

The methods S100, S200 are described herein as executed by the system 100 during a horizontal boring operation. However, the system 100 can additionally or alternatively execute Blocks of the methods S100, S200 during vertical and angled boring operations.

Generally, the system 100 executes Blocks of the methods S100, S200 while boring through underground geologies with plasma in order to avoid melting rock (e.g., creating lava) and instead maintain spoil in the form of a gas (e.g., gaseous carbonate) with spall (e.g., rock flakes), thereby enabling a spoil evacuator within the system 100 to draw spoil—removed from the bore face—rearward and out of the bore with limited spoil entrapment between the system 100 and the bore face and with limited collection of spoil along the spoil evacuator (e.g., due to condensation of molten rock or "slag" on cooler surfaces within the spoil evacuator). Additionally or alternatively, the system 100 modulates power, gas flow rate, and/or standoff distances according to Blocks of the methods S100, S200 in order to achieve a target rate of lava creation (e.g., a target lava volume creation rate), such as in preparation for applying lava to the surface of the bore to form a lava tube of target thickness and profile.

In particular, various geologies may contain crystals (e.g., $SiO_2$) in large proportions, such as sandstone, granite, and basalt. For example, basalt commonly contains 30-40% $SiO_2$ by volume and may contain as much as 80% $SiO_2$ by volume. $SiO_2$ exhibits relatively a low melting temperature. However, the crystalline structure of $SiO_2$ may decompose below the melting temperature of $SiO_2$. Therefore, the system 100 can implement Blocks of the methods S100, S200 to control the temperature of material at the bore face near the crystalline decomposition temperature of $SiO_2$—and below the melting temperature of $SiO_2$—in order to decompose the crystalline structure of material across the bore face and to thus fracture (or disintegrate) this material while not melting this material (or controlling a volume of melted material per unit distance bored by the system 100).

More specifically, the system 100 executes Blocks of the methods S100, S200 in order to fracture and disintegrate rock (and soil, etc.) at the bore face before these materials melt. By fracturing material at the face of the bore rather than melting this material, the system 100 can remove less complex spoil (e.g., e.g., gas and solid rock spall only rather than gas, spall, and lava) with less heat, which may extend the operating life of components of the system 100, reduce energy consumption per unit distance (or volume) bored, and reduce overall expenses associated with boring operations through increased efficiency and longevity of the system 100.

Furthermore, the effectiveness of fracturing material at the bore face (e.g., via thermal shock) may be a function of pressure and heat. To increase pressure at the bore face, the system 100 can: decrease the distance from the plasma torch to the bore face (hereinafter "standoff distance") and/or increase gas flow rate through the plasma torch; the system 100 can also increase plasma torch power to compensate for increased gas flow rate. Similarly, to increase temperature at the bore face, the system 100 can: decrease bore speed or increase dwell time; decrease the standoff distance; and/or increase torch power and gas flow rate.

The methods S100, S200 are described herein as executed by the system 100 to bore through felsic geologies containing high proportions of crystals, such as $SiO_2$. However, the system 100 can additionally or alternatively execute Blocks of the methods S100, S200 to bore through other igneous, metamorphous, and sedimentary geologies such as intermediate, mafic, and ultramafic geologies; sand, soil, silty sand, clay, cobbles, loam, etcetera.

Furthermore, the methods S100, S200 are described here as executed by the system 100 to remove material from a bore face via spallation and gasification (or vaporization) while minimizing or eliminating melting of material at the bore face. However, the system 100 can additionally or alternatively execute Blocks of the method S100 to control a rate or volume of melting of material at the bore face, such as to achieve a target thickness of a glassified layer of rock lining the wall of the bore.

Applications: Jet Thrust Boring Variation

Generally, a jet-thrust type variation of the system 100 includes: a chassis; a propulsion subsystem (e.g., a set of driven wheels or tracks) configured to advance the chassis forward through an underground bore; and a fully-contained cutterhead including a Brayton-cycle turbojet engine (hereinafter the "engine") mounted to the chassis and configured to compress fresh air from an above-ground air supply within a compressor, to mix this compressed air with fuel from an above-ground fuel source, to combust this mixture, to extract energy from these combustion products to drive the compressor, and to exhaust these high-temperature, high-mass-flowrate exhaust gases toward a face of an underground bore. These high-temperature, high-mass-flowrate exhaust gases—reaching the bore face within a jet impingement area—can thermally shock geologies at the bore face, thus leading to spallation of geologies and removal of rock spall from the bore face.

Furthermore, vitrification at the bore face may lessen or inhibit thermal spallation at the bore face and thus yield a reduction in rock removal per unit time and per unit energy consumed by the system 100 relative to rock removal via spallation. Therefore, the system 100 can further include: a temperature sensor configured to output a signal representing a temperature of these exhaust gases; and a controller configured to vary fuel flow rate into the engine (e.g., a "throttle position") and/or other boring parameters within the engine in order to maintain the temperature of these exhaust gases below the minimum melting temperature of all geologies present at the face (e.g., less than 1400° C.) or below the melting temperature of a particular geology detected at the bore face in order to prevent vitrification of the surface of the bore face, maintain spallation across the bore face, and maintain a high volume of rock removal per unit time and per unit energy consumed by the system 100.

In particular, the system 100 can execute Blocks of the methods S100, S300 to bore through rock via thermal spallation by directing a high-energy (e.g., high-temperature and/or and high-mass flow rate) stream of exhaust gases toward a bore face. These high-energy exhaust gases rapidly transfer thermal energy into the surface of the bore face, thus resulting in a rapid thermal expansion of a thin layer of rock at the surface of the bore face. Expansion and local stresses occur along natural discontinuities and nonuniformities that exist in the microstructure of rock matrix, causing differential expansion of the minerals of which the rock matrix is composed, in turn causing stresses and strains along and between mineral grains. Because geologies are typically brittle, rapid thermal expansion of rock at the surface of the bore face causes this thin, hot surface layer of rock to fracture from the cooler rock behind the bore face. This thin, hot surface layer of rock may therefore break into rock fragments (or spall) and separate from the surface of the bore face during this spallation process. The mechanism of fracturing or induction of micro-stresses at the surface of the bore face may vary across lithologies based on mineralogy, material properties, chemical properties, and physical properties of the surface subjected to these exhaust gases.

However, if temperature of the exhaust gases reaching the bore face exceed the melting temperature of the geology at the surface of the bore face, the surface of the bore face may melt and flow down the bore face rather than fracture and release from the bore face. Molten rock may: absorb more energy per unit mass than spall; flow slowly down the bore face rather than breaking and releasing from the surface of the bore face like spall; and thermally shield non-molten material on the bore face (e.g., material directly behind or around the area of molten material) from energy carried by the exhaust gases output by the engine. Therefore, relative to spallation, molten rock at the bore face may result in immediate reduction in the volume or mass of rock removed from the bore face per unit time and per unit energy consumed by the engine, for example because energy consumed by the engine is thus directed to changing the phase of rock at the bore face rather than sequentially fracturing thin layers of rock from the bore face.

Thus, the system 100 can include a Brayton-cycle turbojet engine—with its outlet nozzle facing toward the bore face—to generate high-temperature exhaust gases and to direct these exhaust gases at a high-volume flow rate in order to maintain a high pressure and a high total heat flux at the bore face and to achieve rapid spallation and material removal from the bore face. The system 100 can also implement closed-loop controls to maintain the temperature of these exhaust gases below the melting temperature of all geologies (e.g., 825° C. to compensate for melting temperatures between 900° C. and 1400° C. for most geologies) or below a particular geology detected at the bore face. A geology at the bore face may therefore be unlikely to melt in the presence of these exhaust gases from the engine. The system 100 can also maintain a high mass flow rate in order to compensate for sub-melting-temperature exhaust temperatures in order to generate high heat flux at the bore face—and therefore high rate of spallation of rock at the bore face—with low risk of melting the bore face over a wide range of geologies.

Furthermore, the engine can approach transformation of nearly one hundred percent of the energy contained in supplied fuel (e.g., liquid diesel) into heat and kinetic energy of the exhaust gases, which the system 100 then directs toward the bore face to spall the rock. In one example implementation, the engine includes: a combustor that burns fuels; a turbine that transforms pressure and thermal energy of gases exiting the combustor into mechanical rotation of a driveshaft; and an integrated axial compressor that is powered by the turbine via the driveshaft to draw air into the engine, to compress this air, and to feed this air into the combustor.

The engine may therefore be fully contained and may require no or minimal external (i.e., above-ground) support systems in order to bore an underground tunnel through various geologies. In particular, the system 100 can be connected solely to: an air supply that feeds fresh, unconditioned, above-ground air at any temperature and humidity into the compressor; a fuel supply that feeds fuel from an above ground supply (e.g., a fuel tank) into a fuel metering unit within the engine; and/or an above-ground monitoring system or remote control via low-power sensor and data lines.

Therefore, substantially all energy consumed during a boring operation may be consumed at the bore face by the engine to convert chemical energy in the fuel into: heat at the bore face; kinetic energy of exhaust gases producing pressure at the bore face; kinetic energy of exhaust gases moving off of the bore face and drawing spall rearward behind the engine; and kinetic energy to rotate the turbine and compressor. In particular, because the compressor and combustor are fully integrated into the engine and because the engine is configured to function solely on (unconditioned) air and fuel supplies, the system 100 may require that no or minimal energy be consumed by fans, pumps, cooling systems, etc. to power and cool above-ground subsystems or to pump air to the engine.

The system 100 can therefore require minimal setup time and complexity in order to bore an underground tunnel. For example, an operator may: dig a shallow trench at the start of the tunnel; place the system 100 in the trench; connect a fuel supply line extending rearward from the system 100 to an above-ground fuel reservoir (e.g., a mobile fueling rig); locate an end of an air supply line—extending rearward from the system 100—in an unobstructed above-ground location; and start the engine, for example with a small electric starter motor integrated into the system 100.

The engine can then: draw air into the compressor via the air supply line; combust pressurized air and fuel in the combustor; extract some energy from the resulting exhaust gases at the turbine to power the compressor; and eject hot gases at high mass flow rate toward the bore face to spall and remove material from the bore face. Concurrently, the propulsion subsystem can move the engine forward at a rate proportional to material removal from the bore face in order to maintain a standoff distance between the nozzle and the bore face. Additionally or alternatively, the propulsion subsystem can move the engine forward based on material removal from the bore face, the temperature and velocity of the exhaust gases exiting the nozzle, raster rate of the nozzle across the bore face, and/or the standoff distance in order to maintain consistent heat flux across the bore face.

Thus, the system 100 can execute Blocks of the methods S100, S300 to remove material from the bore face without substantive above-ground air and power support systems, thereby simplifying setup and deployment of the system 100 to bore an underground tunnel.

Boring Initialization

To initiate a boring operation, the system 100 is located at a bore entry. For example, for a horizontal boring operation, a ground opening (or "launch shaft") is dug (e.g., manually) at a start depth of the bore and at a width and length sufficient to accommodate the system 100 in a horizontal orientation. With the system 100 located at the bore entry and the torch adjacent a bore face, the controller can: implement methods and techniques described below to measure the standoff distance from the torch to the bore face; implement closed-loop controls to drive the torch to a nominal standoff distance (e.g., 6"); and then activate the torch by ramping the torch to a baseline power setting and to a baseline gas flow rate.

Closed-Loop Controls

As described below, during phases of the boring operation, the controller 180 can receive data, monitor sensors, measure parameters, determine states of the system 100, calculate corrections, adapt to changes in the geology of the bore face 200, and transmit instructions and direction to one or more components, subsystems, actuators, or sensors of the system 100 in order to improve or optimize system 100 performance (e.g., boring rate) at the bore face 200 in an autonomous or substantially autonomous manner.

The closed-loop controls described herein can be generally applied to any type of non-contact boring element 130. In example implementations, the system 100 can include a non-contact boring element 130 that is configured to displace material from the bore face 200 through temperature, pressure, air flow, or a combination thereof. In specific example implementations, the non-contact boring element 130 includes a plasma torch, a cutterhead including a Brayton-style jet engine, or a flame jet. However, the system 100 can alternatively or additionally include any other thermal and/or pressure inducing non-contact boring element 130.

Standoff Distance

In one implementation shown in FIG. 2, the system 100 includes a single depth sensor 190 arranged near the leading face of the system 100 near the non-contact boring element 130 and including: a contact probe 192; a linear actuator 194 configured to extend the contact probe 192 toward the bore face 200 and to retract the contact probe 192, such as into a thermally-shielded housing; and an encoder or other sensor configured to track the length of the contact probe 192 extending from the leading face of the system 100.

In this implementation, the controller 180 can intermittently trigger the depth sensor 190 to execute a standoff measurement cycle, such as once per minute. During a standoff measurement cycle, the controller 180 can: direct the linear actuator 194 to extend the contact probe 192 out of the housing; read a length measurement from the sensor once resistance on (or current draw from) the actuator reaches a threshold resistance (or threshold stall current); return this length measurement to the controller 180; and trigger the linear actuator 194 to retract the contact probe 192 back into the housing.

Furthermore, when the contact probe 192 is extended out of the depth sensor 190 housing during a standoff measurement cycle, the controller 180 can adjust a boring parameter (e.g., air flow, fuel flow, gas flow, electrical power) of the non-contact boring element 130 in order to reduce surface temperature at the bore face 200 and thus reduce thermal shock and/or heat-induced warpage of the contact probe 192. The controller 180 can subsequently readjust or modify the boring parameter of the non-contact boring element 130 to resume boring by increasing the surface temperature at the bore face 200 once the linear actuator 194 returns the contact probe 192 to the housing.

Upon receipt of a length measurement from the depth sensor 190, the controller 180 can store this length measurement as a current standoff distance. The controller 180 can also: calculate a ram reset distance based on the current longitudinal position of the non-contact boring element ram 170; reset the non-contact boring element ram 170 to a home position over a reset distance; and actuate the propulsion system 120 to move the system 100 forward by a sum of the ram reset distance and a difference between the current standoff distance and a current target standoff distance, thereby locating the non-contact boring element 130 at the target standoff distance.

In another implementation, the contact probe 192 can be spring loaded on the linear actuator 194 and/or the depth sensor housing is spring-loaded on the chassis 110. During a standoff measurement cycle, the controller 180 triggers the depth sensor 190 to extend the contact probe 192 to the current target standoff distance. If the contact probe fails to meet resistance at this target standoff distance, the controller 180: retracts the non-contact boring element ram 170 to the home position; advances the propulsion system 120 forward until the contact probe 192 meets resistance (i.e., contacts the bore face 200), thereby setting the non-contact boring element 130 at the target standoff distance; records a bore distance since a last standoff measurement cycle based on the distance traversed by the non-contact boring element ram 170 and the propulsion system 120 within the bore; and then triggers the depth sensor 190 to retract the contact probe 192.

In this implementation, after recording a standoff distance and resetting the non-contact boring element 130 to the target standoff distance during a standoff measurement cycle, the controller 180 can: implement dead-reckoning techniques to estimate the current standoff distance as a function of the last measured standoff distance, boring parameters associated with the non-contact boring element 130; and implement closed-loop controls to adjust the non-contact boring element ram 170 position and/or advance the propulsion system 120 to maintain the estimated current standoff distance at the target standoff distance. The controller 180 can then trigger a next standoff measurement cycle once the estimated bore distance completed by the system 100 exceeds a threshold distance (e.g., one inch) or after a threshold duration of time.

For example, after recording a standoff distance during a standoff measurement cycle, the controller 180 can sum this standoff length measurement with changes in non-contact boring element ram 170 and propulsion system 120 position since the preceding standoff measurement cycle in order to calculate the total boring distance over a boring interval between the current and preceding standoff measurement cycles. In this example, the controller 180 can also: record boring parameters during this boring interval; and calculate or refine a standoff distance model linking linear boring distance to boring parameters and standoff distance as a function of time based on data collected over this boring interval (and during preceding boring intervals). The controller 180 can then: implement dead reckoning techniques to estimate linear bore distance over a next boring interval based on the standoff distance model, boring parameters during the boring interval, and the last measured standoff distance; re-estimate the standoff distance based on this linear bore distance; and advance the non-contact boring element ram 170 and/or the propulsion system 120 forward during this boring interval in order to maintain the actual standoff distance between the non-contact boring element 130 and the bore face 200 at the target standoff distance.

As shown in FIGS. 4A and 4B, in one variation of the example implementation the non-contact boring element 130 is a plasma torch 132. In this variation, the contact probe 192 can be electrically shielded, and the system 100 can regularly or continuously read a standoff distance from the depth sensor 190. For example, the contact probe 192 can include a stainless steel or low-alloy steel shaft and can be driven to a reference voltage—such as to the same voltage as the cathode in the plasma torch 132 or to the average voltage of the cathode and anode in the plasma torch 132—thereby creating an electric field around the contact probe 192 that repels charged plasma, gas, and spall flowing between the plasma torch 132 and the bore face 200.

Therefore, in this implementation, the controller 180 can drive the contact probe 192 forward to maintain continuous or substantially continuous contact with the bore face 200, and the controller 180 can drive the plasma torch ram 170 and/or the propulsion system 120 forward to maintain a target standoff distance between the plasma torch 132 and the bore face 200 based on a standard distance read and output by the depth sensor 190.

Alternatively, the depth sensor 190 can regularly or continuously oscillate the contact probe 192 fore and aft (e.g., along the X-axis shown in FIG. 4B) during operation, such as: by partially retracting the contact probe 192 to enable fracture and spallation of rock at the bore face 200 ahead of the contact probe 192 or by fully retracting the contact probe 192 into a thermally-shielded housing within the chassis 110 to enable the contact probe 192 to cool; and then advancing the contact probe 192 forward and into contact with the bore face 200. Once the contract probe 192 makes contact with the bore face 200, the controller 180 can determine or calculate a current standoff distance as described above.

The controller 180 can also regularly drive the plasma torch ram 170 and/or the propulsion system 120 forward to maintain a target standoff distance between the plasma torch 132 and the bore face 200 based on a measured length of the contact probe 192 upon last contact with the bore face 200. Furthermore, the controller 180 can implement dead-reckoning techniques to estimate current standoff distance, adjust the plasma torch ram 170 position, and/or advance the propulsion system 120 to maintain this estimated current standoff distance at the target standoff distance, and adjust boring parameters such as electrical power and gas flow rates to the plasma torch 132, in time intervals between consecutive standoff distance measurements with the contact probe 192.

In another variation of the example implementation, the system 100 includes multiple contact-based depth sensors 190, each configured to extend from the leading face of the system 100 and to measure a distance from its position on the leading face of the system 100 to a corresponding position on the bore face.

In one implementation, the system 100 includes a set of contact-based depth sensors 190 arranged in a pattern about the perimeter of the leading face of the system 100. The set of contact-based depth sensors 190 can include two or more depth sensors 190 arranged such that they cooperate to determine a range of depths to the bore face 200, and from which the controller 180 can estimate or interpolate a topography of the bore face 200. For example, a set of three, four, five, six, etcetera contact-based depth sensors 190 can be arranged symmetrically or asymmetrically about the leading face of the system 100 to provide three, four, five, six, etcetera points of depth measurement along the bore face 200, from which the controller 180 can determine a generalized topography of the bore face 200, and based on which the controller 180 can implement closed-loop controls to manage and optimize system performance.

In this variation of the example implementation, the system 100 implements methods and techniques described above to regularly or intermittently measure a distance from each contact-based depth sensor 190 to the bore face 200. The controller 180 then: identifies a particular contact probe 192 indicating a shortest distance to the bore face 200, which can generally represent a location of a low-yield (or most-resilient) region at the bore face 200; and advances the plasma torch ram 170 and/or the propulsion system 120 forward toward the bore face 200 in order to set the standoff distance between the particular contact probe 192 and the corresponding low-yield region of the bore face 200 to the target standoff distance.

As shown in FIG. 4B, the controller 180 can also tilt (e.g., pitch, yaw) the plasma torch ram 170 in the direction of the depth sensor 190, such as by an angular distance proportional to a difference between the shortest standoff distance 300 and longest standoff distance 302 measured by the set of depth sensors 190. With the axis of the plasma torch 132 now oriented nearer the low-yield region at the bore face, the system 100 can preferentially heat and fracture this low-yield region of the bore face 200. The controller 180 can also: implement dead reckoning to predict removal of material from the bore face 200, such as described above; and transition the plasma torch 132 back to its centered position coaxial with the bore as the controller 180 predicts removal of material from the low-yield region at the bore face 200 and flattening or smoothing of the bore face 200.

In a similar implementation, after measuring a standoff distance at each depth sensor 190, the controller 180 can: interpolate a depth profile around the perimeter of the bore based on these standoff measurements and known positions of these depth sensors 190 on the leading face of the system 100. Generally, a shallowest section of the depth profile represents a low-yield region at the bore face 200, and a deepest section of the depth profile represents a highest-yield region at the bore face 200 given the current position of the system 100 relative to the bore face 200. Therefore, given current operating parameters of the plasma torch 132, the controller 180 can: tilt the plasma torch 132 in the direction of a shallowest section of the depth profile, such as by an angular distance proportional to a distance between the shallowest section and the deepest section in the depth profile or proportional to a distance between the shallowest section in the depth profile and a nominal bore face plane; and continue or resume actuation of the plasma torch 132 with the axis of the plasma torch 132 now oriented toward the low-yield region at the bore face 200 in order to preferentially heat and fracture this low-yield region of the bore face 200. In order to focus material removal in this low-yield region, the controller 180 can also decrease the target standoff distance; maintain (or increase) gas flow rate and/or power to the plasma torch 132 in order to prevent melting of material at this low-yield region while increasing pressure at this low-yield region of the bore face 200. The controller 180 can then implement dead reckoning to predict removal of material from the bore face and/or measure a change in bore profile directly, as described above. As the controller 180 predicts or measures removal of material from this low-yield region toward the nominal bore face shape, the controller 180 can tilt the plasma torch 132 toward a next-shallowest section in the depth profile and repeat the foregoing process to level the bore face 200 to the nominal bore face shape before re-centering the plasma torch 132 to zero degree pitch and yaw positions and resuming longitudinal boring parallel to the axis of the bore.

Therefore, in this variation, the system 100 can scan the torch to different angular positions relative to the longitudinal axis of the bore to selectively increase material removal from low-yield regions of the bore face 200 based on standoff distances from the leading end of the system 100 to the perimeter of the bore face 200.

In a similar variation, the system 100 further includes a center contact-based depth sensor 190 inset from the outer set of contact-based depth sensors 190, such as arranged near an axial center of the leading face of the system 100. Accordingly, the controller 180 can fuse a standoff measurement from the center depth sensor 190 with concurrent standoff measurements from the set of perimeter depth sensors 190 to interpolate a bore profile across the bore face 200.

For example, if the bore profile represents a gradient from a perimeter of the bore face 200 to a center of the bore face 200 that is less than a target depth range (i.e., if the bore face is overly planar), the controller 180 can predict that the bore is oversized. Accordingly, the controller 180 can: reduce the target standoff distance from the center depth sensor 190 to the center of the bore face 200 to reduce thermal material removal at the perimeter of the bore; and reduce power to the plasma torch 132 in order to prevent melting near the center of the bore face 200 given this reduced target standoff distance. In this example, the controller 180 can additionally or alternatively increase the advance speed of the propulsion system 120 and/or the plasma torch ram 170, such as in response to calculating a high removal rate concurrently with a shallow gradient across the bore face.

Conversely, if the gradient from the perimeter of the bore face 200 to the center of the bore face 200 is greater than the target depth range (i.e., the bore face 200 is overly conical), the controller 180 can predict that the bore is undersized and therefore too narrow for the system 100 to advance. Accordingly, the controller 180 can increase the target offset distance, power, and gas flow rates in order to achieve greater pressure and energy at the perimeter of the bore. In this example, the controller 180 can additionally or alternatively decrease the advance speed of the propulsion system 120 and/or the plasma torch ram 170, such as in response to calculating a low removal rate (as described below) concurrently with a steep gradient across the bore face 200.

Therefore, in this variation, the system 100 can scan or raster the plasma torch 132 to different positions across the bore face 200 (e.g., pitch, yaw, elevation along the Z-axis, translation along the Y-axis) in order to selectively increase material removal from low-yield regions of the bore face 200 based on a profile of the bore face 200 derived from standoff distances between from the leading end of the system 100 and multiple positions across the bore face 200.

In another variation of the example implementation shown in FIG. 2, the system 100 includes one or more single-point contactless depth sensors 190.

In one implementation, the system 100 includes: a thermally shielded sensor housing; a thermally shielded shutter arranged across an opening in the shutter housing; and a single-point depth sensor 190 arranged in the housing behind the shutter, such as a radar-based depth sensor (e.g., a millimeter-wave radar sensor), an infrared sensor, an ultrasonic sensor, a laser (e.g., LIDAR, time of flight) sensor, etcetera.

Throughout operation, the controller 180 can: open the shutter; sample the depth sensor 190 to capture a depth measurement at a point on the bore face 200; and then close the shutter to shield the depth sensor 190 from excess heat. For example, the controller 180 can intermittently trigger the depth sensor 190 to execute a standoff measurement cycle, such as once per minute as described above.

Alternatively, the system 100 can include a temperature sensor within the sensor housing. During operation, the controller 180 can: regularly sample this temperature sensor; open the shutter and read standoff measurements from the depth sensor 190 when the temperature in the housing is below an operating temperature range; and close the shutter and cease standoff measurements when the temperature in the housing is above the operating temperature range.

In this variation, the system 100 can implement methods and techniques described above to verify the standoff distance from the non-contact boring element 130 to the bore face 200 based on outputs of the depth sensor 190 and to reposition the non-contact boring element ram 170 and/or the propulsion system 120 accordingly to maintain the target standoff distance.

In this variation, the system 100 can also: include multiple single-point contactless depth sensors 190; implement methods and techniques described above to calculate a bore perimeter or bore face profile; and then implement methods and techniques described herein to adjust the orientation of the non-contact boring element 130 and associated boring parameters according to this bore perimeter or bore face profile.

In another variation of the example implementation, the system 100 includes: a thermally shielded sensor housing; a thermally shielded shutter arranged across an opening in the shutter housing; and a multi-point depth sensor 190 arranged in the housing behind the shutter, such as a radar-based depth sensor 190, such as a multi-point millimeter-wave radar sensor, a 2D depth camera, or a 3D LIDAR camera. In this implementation, the controller 180 can: open the shutter and sample the depth sensor 190 during a standoff measurement cycle; derive a bore face profile from an output of the depth sensor 190 during this standoff measurement cycle; and adjust operation of the system 100 accordingly, as described above.

For example, the controller 180 can: interpolate a 3D profile of the bore face 200 directly from an output of the depth sensor 190 including multiple depth measurements to multiple points on the bore face 200; tilt the non-contact boring element 130 in an orientation corresponding to a shallowest region represented in the bore face profile, thereby bringing the non-contact boring element 130 nearer a corresponding low-yield region at the bore face 200; reduce the target standoff distance at this low-yield region of the bore face proportional to a gradient from this low-yield region to the center of the bore; and adjust a boring parameter of the non-contact boring element 130 in order to prevent melting of material at this low-yield region of the bore face 200.

In this variation of the example implementation, the controller 180 can: continue to sample the depth sensor 190, such as intermittently or continuously while removing material from this low-yield region of the bore face 200; recalculate the bore face profile accordingly; and reorient the non-contact boring element 130 to align with the lowest-yield region detected in each subsequent bore face profile thus calculated by the controller 180. In particular, as the gradient across the bore face profile lessens, the controller 180 can re-center the longitudinal axis of the non-contact boring element 130 with the longitudinal axis of the bore, increase standoff distance, and adjust boring parameters of the non-contact boring element 130 in order to achieve more uniform fracturing, gasification, spallation, and general removal of material across the bore face 200.

In other variations of the example implementation, the system 100 can include a set of depth sensors 190 including a combination of contact sensors and non-contact sensors. Furthermore, in still other variations of the example implementation, the system can include a non-contact depth sensor 190 that includes subcomponents or functionality (e.g., an optical camera paired with a LIDAR range finder) to provide optical or topological data regarding a temperature profile or topological profile of the bore face 200, as described in more detail below.

Closed-Loop Control: Temperature Control

As shown in FIG. 6, in one variation of the example implementation, the non-contact boring element 130 includes a cutterhead 140 including a Brayton-style turbojet engine. In this variation of the example implementation, the controller 180 can employ closed-loop controls to maintain a target temperature of the exhaust gases 220 directed at the bore face 200. Alternatively, the closed-loop temperature controls described herein can be applied to other types of non-contact boring elements 130, including one or more plasma torches 132 and/or flame jets.

As shown in FIG. 6, this variation of the system 100 can include: a controller 180; a temperature sensor 156 (e.g., a thermocouple) arranged near an exit of the nozzle 160 (e.g., near an exit of the nozzle 160 or between the nozzle 160 and the bore face 200); and a fuel metering unit 146 configured to adjust a rate of fuel injected into the flame tube. Generally, during operation, the controller 180 can: track a temperature of exhaust gases 220 exiting the nozzle 160 based on a signal output by the temperature sensor 156; and regulate a rate of fuel entering the combustor 144—via the fuel metering unit 146—to maintain the temperature of exhaust gases 220 exiting the nozzle 160 below the melting temperatures of all geologies or below the melting temperature of a particular geology predicted or detected at the bore face 200.

In particular, the controller 180 can: set a target exhaust gas temperature, such as described below; sample the temperature sensor 156 to track the temperature of exhaust gases 220 exiting the nozzle 160; and then implement closed-loop controls to adjust the fuel metering unit 146 to increase the rate of fuel injected into the combustor 144 if the temperature of these exhaust gases 220 is less than the target temperature; and adjust the fuel metering unit 146 to decrease the rate of fuel injected into the combustor 144 if the temperature of the exhaust gases 220 is more than the target temperature. For example, the controller 180 can: read the temperature of exhaust gases 220 at a frequency of 10Hz; and then calculate an average of these temperatures and update the fuel flow rate based on this average temperature at a frequency of 1Hz.

In one variation of the example implementation, the system 100 further includes an air metering unit 148 configured to vary a dilution ratio of: the first portion of compressed air entering the primary zone of the combustor 144 to the second portion of compressed air entering the dilution zone of the combustor 144.

In one implementation, the air metering unit 148 includes a sleeve 150 configured to slide over a range of positions along the combustor 144, such as including: a 1:0 dilution ratio position in which the sleeve 150 fully exposes the first set of perforations and fully encloses the second set of perforations in the combustor 144; a 2:1 dilution ratio position in which the sleeve 150 predominantly exposes the first set of perforations and predominantly encloses the second set of perforations in the combustor 144; a 1:1 dilution ratio position in which the sleeve 150 similarly exposes the first and second sets of perforations in the combustor 144; and a 1:2 dilution ratio position in which the sleeve 150 predominantly encloses the first set of perforations and predominantly exposes the second set of perforations in the combustor 144.

In this variation of the example implementation, the air metering unit 148 can also include an actuator 152 configured to transition the sleeve 150 along this range of positions. Thus, during operation, the controller 180 can set a target exhaust gas temperature, such as described below, detect a temperature of the exhaust gases 220 exiting the nozzle 160, and implement closed-loop controls to: adjust the air metering unit 148 to increase the dilution ratio-and increase the fuel flow rate accordingly to maintain a target air-fuel ratio-if the temperature of the exhaust gases 220 is less than the target temperature; and adjust the air metering unit 148 to decrease the dilution ratio—and decrease the fuel flow rate accordingly to maintain the target air-fuel ratio—if the temperature of the exhaust gases 220 is more than the target temperature.

Generally, the controller 180 can: set a target exhaust gas temperature based on nominal bore geologies or based on real-time boring characteristics; and then implement closed-loop controls to adjust fuel flow rate and/or dilution ratio within the combustor 144 based on a difference between the measured and target temperatures of exhaust gases 220 exiting the nozzle 160.

For example, in the foregoing implementations, the controller can set and implement a fixed target exhaust gas temperature of 825° C.—that is, less than the minimum melting temperature of most geologies.

The controller 180 can also regularly implement temperature test loops, including: increasing the target exhaust gas temperature; adjusting fuel flow rate and/or dilution ratio to achieve this exhaust gas temperature; measuring standoff distances as described above; and calculating a current boring rate and repeating this temperature test loop. If the current boring rate is greater than the previous boring rate at a lower target temperature (e.g., if material at the bore face is now spalling and releasing from the bore face at a greater rate), the controller 180 can further increase the target exhaust gas temperature and repeat the process. However, if the current boring rate is less than the previous boring rate at the lower target temperature (e.g., if material at the bore face is now melting rather than spalling), the controller 180 can decrease the target exhaust gas temperature and repeat this temperature test loop. Thus, in this example, the controller 180 can adjust the target exhaust gas temperature based on real-time boring rate, such as including: increasing the target exhaust gas temperature to maintain high thermal shock and spallation of harder geologies; and decreasing the target exhaust gas temperature to prevent melting of softer geologies, thereby maintaining the exhaust temperature above the average spallation temperature of the surface and below the minimum melting temperature of any point on the surface and thus maximizing material remove from the bore face 200.

Closed-Loop Control: Removal Rate

The system 100 can additionally or alternatively calculate removal rate and adjust power, gas flow rate, and/or target standoff distance, etc. based on a difference between this removal rate and a target removal rate (or target removal rate range). In particular, the controller 180 can implement closed-loop controls to modulate standoff distance, non-contact boring element orientation, and boring parameters, as described above, in order to maintain uniform fracturing and spallation of rock at the bore face 200 without melting while maintaining a minimum removal rate from (or minimum advance through) the bore.

For example, in a plasma torch 132 configuration, increasing power to the plasma torch 132 may support greater gas flow rate though the plasma torch 132 and therefore greater pressure at the bore face 200 and greater removal rate. However, greater power and gas flow rate through the plasma torch 132 may: non-linearly reduce operating life of plasma torch 132 components; reduce total bore volume removal with these plasma torch 132 components; require more-frequent withdrawal of the system 100 from the bore for maintenance; require a larger power and gas supply; and reduce overall operating efficiency of the system 100.

Similarly, in a jet engine cutterhead configuration, increasing air flow, fuel flow, and afterburner use can increase the temperature and pressure at the bore face 200, yielding a temporarily higher removal rate. However, a full burn scenario for the cutterhead 140 may also: result in temperature spikes at the bore face 200 that result in melting of material; generate large spall fragments that impede further progress of the system 100 through the bore; induce increased wear and replacement rates for the cutterhead 140 components; and greatly increase the operating costs of the system 100 while lowering the overall operating efficiency of the system 100. Therefore, the controller 180 can implement closed-loop controls to adjust operating parameters of the system 100 to maintain both a minimum removal rate from the bore and high overall operating efficiency.

In the variation of the system 100 that includes one single-point depth sensor 190, the controller 180 implements methods and techniques described above to calculate an advance rate of the bore face 200 by: summing changes in standoff measurement, non-contact boring element ram 170 advancement, and chassis 110 advancement over a time interval (e.g., between two standoff measurement cycles); and dividing this sum by the duration of this time interval. The controller 180 can then calculate a removal rate (e.g., material volume) from the bore face 200 by multiplying the advance rate by a nominal or target cross-sectional area of the bore.

Alternatively, in the variation of the system 100 that includes multiple single-point depth sensors 190 and/or a multi-point depth sensor 190, the controller 180 can: implement methods and techniques described above to calculate bore face profiles during consecutive standoff measurement cycles; calculate an offset distance between two consecutive bore face profiles based on a sum of changes in standoff measurement, non-contact boring element ram 170 advancement, and chassis 110 advancement over a time interval between these standoff measurement cycles; calculate a volume between these bore face profiles based on this offset distance; and then calculate a removal rate during this time interval by dividing this volume by the duration of this time interval.

In this variation, the controller 180 can access a single target removal rate for the bore and then implement closed-loop controls to adjust boring parameters, including electrical power, gas flow rate, fuel flow rate, air flow rate, exhaust gas temperature, and/or target standoff distance, based on the target removal rate.

Alternatively, an operator may: aggregate core samples at a target depth of the bore and at intervals along a planned path of the bore; process these core samples to derive geologies along the planned path; and generate a target removal rate schedule based on these geologies. For example, the operator may specify: a high target removal rate along sections of the planned path characterized by loose soil; a moderate-to-high target removal rate along sections of the planned path characterized by sandstone; a moderate target removal rate along sections of the planned path characterized by limestone; and a low target removal rate along sections of the planned path characterized by granite in the target removal rate schedule.

Accordingly, during operation, the controller 180 can: track its location along the planned path of the bore; query the target removal rate schedule for a target removal rate at a bore section currently occupied by the system 100; and then load this target removal rate.

During operation, the controller 180 can compare the current removal rate to the target removal rate and adjust boring parameters based on this difference.

In particular, a decrease in removal rate below the target removal rate may result from: melting of rock at the bore face 200 rather than fracture and spallation of the bore face 200; or from a change in geology at the bore face (e.g., to a material with less $SiO2$). If the former, the controller 180 can adjust boring parameters, for example by reducing power and gas flow rates and/or increasing standoff distance in a plasma torch 132 configuration, in order to reduce melting at the bore face. If the latter, the controller 180 can adjust boring parameters, for example by increasing power and gas flow rates and/or decreasing standoff distance in a plasma torch 132 configuration, in order to increase pressure at the bore face 200 and thus increase fracture and spallation at the bore face 200. In a cutterhead 140 configuration, the controller 180 can similarly adjust boring parameters, for example fuel flow rate, air flow rate, exhaust temperature, and/or standoff distance, to decrease or increase pressure and/or temperature at the bore face 200 to adjust to changing geologies.

In one example implementation, if the current removal rate is less than the target removal rate, the controller 180 can first increase the target standoff distance (e.g., by a step width of 0.500") and thus retract the non-contact boring element ram 170 while maintaining other boring parameters over a first time interval. The controller 180 can then execute a standoff measurement cycle and recalculate a removal rate from the bore face 200. If this removal rate has increased, the controller 180 can further increase the target standoff distance, retract the non-contact boring element ram 170 accordingly (e.g., by an additional step width of 0.500"), and retest the current removal rate. The controller 180 can repeat this process until the removal rate decreases or decreases below a threshold change in removal rate, at which time the controller 180 can reduce the target standoff distance, advance the non-contact boring element ram 170, and implement similar methods and techniques to test effects of adjusted boring parameters on removal rate.

Therefore, in this implementation, the controller 180 can first increase the target standoff distance in order to preempt a decrease in removal rate due to melting of the bore face 200. If increase in the standoff distance between the non-contact boring element 130 and the bore face 200 increases removal rate, the controller 180 can verify that the decrease in removal rate was due to melting of material at the bore face 200 and iteratively increase the standoff distance in order to further increase removal rate and further reduce melting at the bore face 200 before increasing any boring parameters that would result in further material melting.

However, if increasing the standoff distance reduces or fails to affect the removal rate, the controller 180 can predict that the decrease in removal rate is due to a change in geology at the bore face 200. Accordingly, the controller 180 can reduce the target standoff distance, adjust boring parameters as necessary in order to increase pressure at the bore face 200. For example, the controller can iteratively decrease the standoff distance, execute standoff measurement cycles, recalculate removal rate, and verify increase in removal rate responsive to reduction in standoff distance. Upon verifying increase in removal rate responsive to reduction in standoff distance, the controller can: iteratively adjust boring parameters to increase pressure at the bore face 200; recalculate removal rate; and then readjust or maintain boring parameters once any further increase in pressure at the bore face 200 results in a decrease in removal rate.

Therefore, in this implementation, the controller 180 can: first increase the target standoff distance responsive to a decrease in removal rate; verify that this increase in target standoff distance improves removal rate; and then only decrease the target standoff distance upon verifying that increasing the target standoff distance failed to improve removal rate, thereby preempting further melting of the bore face 200 and generation of slag within the bore and along the evacuation system.

Additionally or alternatively, the controller 180 can implement similar methods and techniques to: first adjust the boring parameters to reduce pressure at the bore face 200 responsive to a decrease in removal rate, verify that adjusted boring parameters improve removal rate; and then only readjust or maintain the boring parameters to increase pressure at the bore face 200 upon verifying that the prior decrease in pressure at the bore face 200 failed to improve removal rate, thereby preempting further melting of the bore face 200 and generation of slag within the bore and along the evacuation system.

Closed-Loop Controls: Bore Face Characterization

In another variation of the example implementation shown in FIG. 6, the system 100 includes an optical sensor 164 directed toward the bore face 200 and configured to output images (e.g., color images, infrared images) of the jet impingement area at the bore face 200. In this example, the controller 180: accesses an image of the bore face 200 captured by the optical sensor 164; and scans the image for “bright” (i.e., high intensity, high color value) pixels that indicate molten material at the bore face 200. If the controller 180 thus detects a “bright” region in the image thus indicating molten material at the bore face 200, the controller 180 can reduce the target exhaust gas temperature. Conversely, if the controller 180 detects no “bright” region in the image thus indicating no molten material at the bore face 200, then the controller 180 can increase the target exhaust gas temperature. The controller 180 can then adjust the fuel flow rate and/or the dilution ratio at the combustor 144 to achieve this updated target exhaust gas temperature. The controller 180 can regularly repeat this process, such as at a frequency of 1 Hz.

In the foregoing example, the controller 180 can implement similar methods and techniques to detect higher temperature—but not yet molten—regions on the bore face 200 (e.g., “hot spots”) based on images captured by the optical sensor and to update the target exhaust gas temperature accordingly.

Generally, the optical sensor 164 is configured to detect frequencies and amplitudes of photons emitted at or near the bore face 200 during non-contact boring and converting the detected frequencies and amplitudes into an image of the bore face 200. In one implementation, the optical sensor 164 can scan the bore face 200 at or near the point of non-contact thermal impingement from a nominal standoff distance. Alternatively, the optical sensor 164 can implement a full-face static scan of the bore face 200 to detect photons emitted after impingement by the non-contact boring element 130. In another alternative implementation, the optical sensor 164 can follow a raster pattern of the non-contact boring element sub-assembly, for example by being attached to or moving in concert with the non-contact boring element ram 170. In variations of the example implementation, the optical sensor 164 can be paired with a light source (not shown) to illuminate the bore face 200 during an optical scan of the bore face 200.

In one implementation, the optical sensor 164 can detect and interpret photons emitted and/or reflected at the bore face using a red-green-blue (RGB) camera detector. Using the RGB camera detector, the optical sensor 164 can generate and store a two-dimensional image representing the photon emissions and/or reflections at the bore face 200 in an RGB view. In another implementation, the optical sensor 164 can detect and interpret photons emitted and/or reflected at the bore face using a cyan-magenta-yellow-black (CMYK) camera detector. Using the CMYK camera detector, the optical sensor 164 can generate and store a two-dimensional image representing the photon emissions and/or reflections at the bore face 200 in CMYK view. In another implementation, the optical sensor 164 can detect and interpret photons emitted and/or reflected at the bore face using an infrared (near-infrared or far-infrared) camera detector. Using the infrared camera system, the optical sensor 164 can generate and store a two-dimensional image of the bore face 200 in an infrared view.

In another variation, the optical sensor 164 includes a combination of RGB, CMYK, infrared, multispectral, and hyperspectral detectors to be used in parallel or serially during the boring process. For example, the system can utilize an RGB camera detector in combination with or in sequence with a hyperspectral imager to get a visible light and non-visible light depiction of the bore face 200. The controller 180 can then fuse or integrate the respective images into a fuller-spectrum view of the bore face 200 indicative of the current or near-current temperature profile of the bore face 200.

Additionally or alternatively, the system 100 can: implement object-tracking techniques to detect and track material moving off the bore face based on features detected in a sequence of images captured by the optical sensor 164; and estimate temperatures or phases of this material based on color, brightness, and/or intensity of pixels identified as spall in these images. The controller 180 can then increase the target exhaust gas temperature if no molten material moving off the bore face 200 is detected; or conversely decrease the target exhaust gas temperature if molten material moving off the bore face 200 is detected. The controller 180 can adjust the target exhaust gas temperature based on any other real-time or near-real time boring characteristic detected or tracked by the sensors or detectors in communication with the controller 180.

Example Configurations

Generally, the techniques and methods described herein can be applied to any type or modality of non-contact boring, including but not limited to: plasma torch, jet engine thrust, flame jet, acoustic energy, electromagnetic radiation (e.g., laser, millimeter wave directed energy), or a combination or subcombination thereof. The following example implementations should therefore be understood as non-limiting with respect to the applicability of other types or modalities of non-contact boring elements.

Example: Plasma Torch System

In one variation of the system 100 shown in FIGS. 4A and 4B, the system 100 can include: a chassis 110; a propulsion system 120 arranged with the chassis 110 to advance the chassis in a first direction toward a bore face 200 and retract the chassis 110 in a second direction away from the bore face 200; a plasma torch 132 connected to a power supply 134 and a gas supply 136; and a plasma torch ram 170 connecting the plasma torch 132 to the chassis 110. As shown in FIGS. 4A and 4B, the plasma torch ram 170 can be configured to position the plasma torch 132 along at least five degrees of freedom. The plasma torch ram 170 can be configured to: locate the plasma torch 132 on the chassis 110; advance and retract the plasma torch 132 along the chassis 110 along a longitudinal axis (X-axis) substantially parallel to the first direction and the second direction; tilt the plasma torch 132 along a pitch angle relative to the longitudinal axis and a yaw angle relative to the longitudinal axis; lift or surge the plasma torch 132 vertically along a vertical axis (Z axis) substantially perpendicular to the longitudinal axis; and shift or heave the plasma torch 132 laterally along a horizontal axis (Y-axis) substantially perpendicular to the longitudinal axis and the vertical axis.

As shown in FIGS. 2, 4A, and 4B, the system 100 can also include a depth sensor 190 configured to measure a standoff distance between the chassis 110 and the bore face 200; and a spoil evacuator configured to draw waste from a first location between the chassis 110 and the bore face 200 to a second location. In this variation of the exemplary implementation, the system 100 can also include a controller 180 connected to the propulsion system 120, the plasma torch 132, the plasma torch ram 170, and the depth sensor 190 and configured to drive the propulsion system 120, the plasma torch 132, the plasma torch ram 170, and the depth sensor 190 in response to the depth sensor 190 measuring the standoff distance between the chassis 110 and the bore face 200. Generally, the controller 180 can implement closed-loop controls of the type described above (e.g., stand-off distance, temperature controls, removal rate, bore face characterization) to manage and direct the system 100 in an autonomous or semi-autonomous manner to achieve efficient removal of material from the bore face 200.

In one variation of the plasma torch 132 example implementation, the system 100 includes multiple plasma torches 132, such as arranged in an array on the leading end of the system 100. For example, the system 100 can include: a primary center plasma torch 132; and a set of secondary plasma torches 132, such as three, five, or seven torches arranged in a symmetrical or asymmetrical pattern about the primary center torch.

In this variation, the controller 180 can implement methods and techniques described above to monitor the standoff distance to the bore face 200, the perimeter profile of the bore face 200, and/or the face profile of the bore face 200 based on outputs of one or more single- or multi-point depth sensors 190 arranged on the leading end of the system 100. Additionally, the controller 180 can implement additional methods and techniques described above to characterize and interpret a temperature profile of the bore face 200; and actuate and direct one or more of the sets of plasma torches to maintain a desired temperature at the bore face 200 (e.g., sufficient to produce spall, insufficient to produce molten material). Additionally, the controller 180 can implement additional methods and techniques described above to maintain a target removal rate, autonomously adjust to variations in the calculated removal rate, and autonomously drive or steer the system 100 along its boring path consistent with the target removal rate.

In this variation, the controller 180 can also implement Blocks of the method S100 to adjust power and gas flow rates to individual torches in the set based on the standoff distance, removal rate, temperature profile, and bore face 200 profile metrics. For example, rather than tilt a single torch toward a low-yield region detected at the bore face 200 to increase thermal and material removal in this region, as described above, the controller 180 can instead increase power and gas flow rate flux to a particular torch (or a subset of torches) nearest this low-yield region in order to break this low-yield region of the bore face 200.

In this variation, each plasma torch 132 can also be mounted to an independently actuated plasma torch ram 170. Accordingly, the controller 180 can: derive a face or perimeter profile of the bore face, as described above; independently actuate the plasma torch rams 170 to set each plasma torch 132 at its assigned standoff distance based on a last (or estimated) face or perimeter profile of the bore face 200; and independently adjust target standoff distances for these plasma torches 132 based on material removal rate or detected temperature from corresponding regions of the bore face 200.

Example: Jet Engine Cutterhead Variation

In another variation of the system 100 shown in FIG. 6, the system 100 can include a chassis 110, and a cutterhead 140 including: a compressor 142 configured to compress air inbound from an above-ground fresh air supply; a combustor 144 configured to mix compressed air exiting the compressor 142 with a fuel inbound from an above-ground fuel supply and to ignite the fuel; a turbine 154 configured to extract energy from combusted fuel and compressed air exiting the combustor 144 to rotate the compressor 142; and a nozzle 160 configured to direct exhaust gases 220 exiting the turbine 154 to induce an area of jet impingement at a bore face 200. As shown in FIG. 6, the system 100 can also include a cutterhead ram 170 connected to the cutterhead 140 and configured to position the cutterhead 140 relative to the bore face 200; a temperature sensor 156; and a controller 180 connected to the cutterhead 140, the temperature sensor 156, and the cutterhead ram 170. In this variation of the system 100 of the example implementation, the controller 180 can be configured to: track a temperature of exhaust gases 220 exiting the nozzle 160 based on a signal output by the temperature sensor 156; and to regulate a rate of fuel entering the combustor 144 to maintain the temperature of exhaust gases 220 exiting the nozzle 160 below a melting temperature and above a spallation temperature of a geology present in the bore. As shown in FIGS. 2 and 6, the system 100 can also include a propulsion system 120 connected to the controller 180 and arranged with the chassis 110 to advance the chassis in a first direction toward a bore face 200 and retract the chassis 110 in a second direction away from the bore face 200.

The system 100 includes or couples to a fuel supply line. In one implementation, the fuel supply line includes a thermally shielded flexible fuel line that connects to an above-ground fuel reservoir (e.g., a mobile diesel fuel tank), runs through the tunnel, and connects to the cutterhead 140 to supply fuel to the cutterhead 140 during operation.

The system 100 can also include a fuel pump (not shown) integrated into the cutterhead 140 and configured to draw fuel from the above-ground fuel reservoir through the fuel supply line and to maintain a minimal fuel pressure within the cutterhead 140. For example, the system 100 can include a mechanical fuel pump driven by a power takeoff from the turbine 154. Alternatively, the system 100 can include: an electric fuel pump; and an electric generator (or an electric starter motor operated in a generator mode) driven by a power takeoff from the turbine 154 and supplying power to the electric fuel pump to draw fuel from the above-ground fuel reservoir.

Additionally or alternatively, the above-ground fuel reservoir can include a fuel pump configured to push fuel toward the engine via the fuel supply line. Furthermore, the system 100 can include a series of inline fuel pumps arranged along the fuel supply line and configured to boost fuel pressure and maintain fuel flow along the fuel supply line, such as over extended tunnel bore lengths (e.g., dozens, hundreds of feet).

Furthermore, as the fuel supply line runs from the above-ground fuel reservoir, along the tunnel, to the cutterhead 140, the fuel supply line may be heated by exhaust gases moving off the bore face 200, around the cutterhead 140, and rearward though the tunnel toward a tunnel opening behind the cutterhead 140. Fuel running through the fuel supply line may therefore be heated by these exhaust gases on its way to the cutterhead 140 and may thus recapture some thermal energy from these exhaust gases and return this thermal energy to the cutterhead 140, which then redirects this recycled heat—with additional heat from burning this fuel—back to the bore face 200.

The system 100 also includes or couples to a fresh air supply line (or "hose") that includes an inlet above ground, runs through the tunnel behind the cutterhead 140, connects to the inlet of the cutterhead 140, and supplies fresh air (or "working fluid") to the compressor 142 during operation. In particular, the air supply line feeds fresh air from above grade to the cutterhead 140, which then compresses this fresh air in the compressor 142, mixes this compressed fresh air with fuel received via the fuel supply line, ignites this air-fuel mixture in the combustor 144, extracts some energy from combusted and expanding exhaust gases via the turbine 154 to rotate the compressor 142, and then releases these high-temperature, high-mass-flowrate exhaust gases 220 toward the bore face 200 to spall and remove material from the bore face 200.

For example, the air supply line can include: a flexible duct hose; and heat shielding over a first section of the flexible duct hose immediately trailing the cutterhead 140 (e.g., a ten-foot section of the air line immediately behind the engine) and configured to shield the flexible duct hose from high-temperature exhaust gases 220 and spall moving off of the bore face and around the cutterhead 140. In this example, the air supply line can also exclude heat shielding over the remainder of the flexible duct hose. Accordingly, this second section of the flexible duct hose may be heated by exhaust gases 220 moving behind the engine and around the flexible duct hose. Fresh air moving through the duct hose may therefore be heated by these exhaust gases 220 on its way to the cutterhead 140 and may thus recapture some thermal energy from these exhaust gases 220 and return this thermal energy to the cutterhead 140, which then redirects this recycled heat—with additional heat from burning fuel—back to the bore face 200. Thus, in this implementation, the air supply line can function as a heat exchanger to recycle heat moving off the bore face 200 and to return this heat to the cutterhead 140.

As shown in FIG. 6, the compressor 142 is configured to compress air inbound from the above-ground fresh air supply. Generally, the compressor 142 is described herein as defining a radial compressor coupled to, driven by, and arranged on the same drive line with the turbine 154. For example, the compressor 142 can include a single- or multi-stage axial compressor including: a set of compressor stator vanes fixedly mounted to the engine; a compressor rotor rotating within the engine; and a set of compressor rotor vanes mounted to the compressor rotor. However, the compressor 142 can alternatively include a centrifugal compressor. The compressor 142 can also be be driven by the turbine 154 via a gearbox, belt drive, or other power transmission subsystem.

As shown in FIG. 6, the combustor 144 is configured to mix compressed air exiting the compressor with fuel inbound from the fuel supply and to ignite this fuel mixture. In one implementation, the combustor 144 includes one or more flame tubes arranged in parallel with the compressor 142 and the turbine 154, each flame tube defining: a primary zone including a first set of perforations; and a dilution zone including a second set of perforations. In this implementation, the combustor 144 can also include a fuel injector attached to a fuel metering unit 146 that sprays fuel into the flame tube ahead of the primary zone. During operation, a first portion of compressed air—exiting the compressor 142—moves into the primary zone of the flame tube via the first set of perforations and mixes with the fuel to form an air-fuel mixture at or near a target ratio (e.g., leaner than a stoichiometric ratio). This air-fuel mixture then combusts (nearly completely) within a primary zone of the flame tube at (near) constant pressure and flows into the dilution zone on its way to the turbine 154. Concurrently, a second portion of air—exiting the compressor 142—moves around and outside of the primary zone of the flame tube, passes through the second set of perforations in the flame tube, and mixes with high-temperature combustion products moving from the primary zone to the dilution zone of the flame tube.

This second portion of compressed air may be much cooler than these high-temperature combustion products and may thus reduce the average temperature of combustion products exiting the combustor and thus reduce the average temperature of exhaust gases subsequently exiting the nozzle 160 and directed toward the bore face.

As described above, the system 100 can also control a "dilution ratio" of the first portion of compressed air to the second portion of compressed air entering and diverted around the flame tube, respectively, in order to maintain a target air-fuel mixture within the primary zone of the flame tube and to control exhaust gas temperature when adjusting fuel flow rate into the combustor.

As shown in FIG. 6, the turbine 154 is configured to extract energy from combusted products exiting the combustor 144 and to rotate the compressor 142. In particular, the turbine 154 can include: a set of turbine stator vanes mounted to the engine; a turbine rotor rotating within the engine and coupled to the compressor rotor (e.g., via a driveshaft and/or gearbox); and a set of turbine rotor vanes mounted to the turbine rotor. Combustion products exiting the combustor 144 may expand isentropically while moving through the turbine stator and rotor vanes of the turbine 154, thus reducing the temperature and pressure of these combustion products and transforming this energy into rotation of the compressor 142.

As shown in FIG. 6, the nozzle 160 is coupled to the output of the turbine and is configured to direct exhaust gases 220 exiting the turbine onto a jet impingement area at the bore face 200.

In one implementation, the system 100 includes a fixed-area nozzle 160 that directs exhaust gases toward the bore face 200 to form a jet impingement area of a target size (e.g., a target diameter) on the bore face 200 at a target standoff distance (or within a narrow range of target standoff distances), as determined by the controller 180, between the nozzle 160 and the bore face 200. For example, the fixed-area nozzle 160 can define a nozzle geometry that yields an impingement area of width approximately ten times the width of the nozzle 160 in order to achieve: a stream of exhaust gases 220 that includes a hot center region shielded by a thick boundary layer; an efficient convection within the center region; a high rate of heat transfer from the center stream into the bore face 200; and thus a high rate of spallation within the jet impingement area.

As described herein, the controller 180 can control standoff distance and angular position of the nozzle 160 on the chassis 110 via the cutterhead ram 170—and therefore relative to the bore face 200—to induce a jet impingement of controlled area on the surface of the bore face 200 and thus evenly excavate one discrete cross-section of the bore face 200 before advancing forward the chassis 110 forward.

In one variation of the example implementation, the system 100 includes a variable-area nozzle 160 including a variable aperture 162 through which the exhaust gases 220 can flow. In this variation, by adjusting the area of the nozzle, the controller 180 can adjust the jet impingement area at the bore face 200 and thus control power density (i.e., heat flux per unit area) within the jet impingement area at the bore face 200.

Generally, the speed of the compressor 142 may be correlated with mass flow rate of air through the cutterhead 140 and thus a pressure within the jet impingement area at the bore face 200. Similarly, fuel flow rate may be correlated with exhaust gas temperature and turbine and compressor speeds. Thus, during operation, the controller 180 can also implement closed-loop controls to: increase fuel flow rate to raise the exhaust gas temperature to a (fixed or variable) target temperature; and increase the nozzle area to compensate for higher compressor speeds resulting from increased fuel flow rate and thus maintain a controlled (e.g., constant) pressure across the jet impingement area. Similarly, the controller 180 can further implement closed-loop controls to: decrease fuel flow rate to decrease the exhaust gas temperature to a (fixed or variable) target temperature; and decrease the nozzle area to compensate for lower compressor speeds resulting from decreased fuel flow rate and thus maintain a controlled (e.g., constant) pressure across the jet impingement area.

In a similar example, the controller 180 can implement additional closed-loop controls to increase the nozzle area at higher compressor speeds in order to reduce the velocity of exhaust gases exiting the nozzle and thus maintain the exhaust gas stream at subsonic speeds.

Conversely, the controller 180 can adjust the nozzle area to: maintain a supersonic exhaust gas stream; and locate a first shock diamond (i.e., an abrupt change in local density and pressure) in the exhaust gas stream at the bore face 200. The complex flow of exhaust gases 220 within and around this shock diamond—positioned at the bore face by the system 100—may result in a high rate of heat transfer, thermal shock, and pressure shock across the jet impingement area, which may yield a high rate of spallation and material removal from the jet impingement area. Thus, in this implementation, the controller can: monitor a standoff distance from the engine to the bore face 200 through any of the methods or techniques described herein; and adjust the nozzle area based on the current exhaust gas temperature, the current air flow rate (or compressor speed, turbine speed) through the cutterhead 140, and the current standoff distance in order to locate a shock diamond (e.g., the first shock diamond) in the exhaust gas flow at the current standoff distance and thus produce thermal and pressure shocks at the bore face 200 that yield an increased rate of material removal.

In another example of closed-loop control of a variable area nozzle 160, the controller 180 can reduce the nozzle area when hard geologies (e.g., igneous and metamorphic rocks) are present at the bore face 200 in order to: achieve greater energy density within the jet impingement area and maintain a high rate of spallation within the jet impingement area despite these harder geologies; while also maintaining exhaust gas temperatures below the low melting temperatures of softer geologies in order to prevent melting at the bore face 200 under mixed-geology bore face conditions or during transitions from harder geologies to softer geologies along the tunnel. Similarly, in this example, the controller 180 can increase the nozzle area when soft geologies (e.g., sedimentary rocks) are present at the bore face in order to increase the size of the jet impingement area and thus maintain a high rate of spallation over a wider bore area with more uniform rock removal across the width and height of the bore.

As shown in FIG. 6, the system 100 also includes: a temperature sensor 156 (e.g., a thermocouple) arranged near an exit of the nozzle 160 (e.g., between the nozzle 160 and the bore face 200); and a fuel metering unit 146 configured to adjust a rate of fuel injected into the combustor 144. Generally, during operation, the controller 180 can: track a temperature of exhaust gases 220 exiting the nozzle 160 based on a signal output by the temperature sensor 156; and regulate a rate of fuel entering the combustor 144—via the fuel metering unit 146—to maintain the temperature of exhaust gases 220 exiting the nozzle 160 below the melting temperatures of all geologies or below the melting temperature of a particular geology predicted or detected at the bore face 200.

As described herein, the controller 180 can: set a target exhaust gas temperature, such as described above; sample the temperature sensor 156 to track the temperature of exhaust gases 220 exiting the nozzle 160; and then implement closed-loop controls to adjust the fuel metering unit 146 to increase the rate of fuel injected into the flame tube if the temperature of these exhaust gases 220 is less than the target temperature; and adjust the fuel metering unit 146 to decrease the rate of fuel injected into the combustor 144 if the temperature of the exhaust gases 220 is more than the target temperature.

As shown in FIG. 6, the system 100 includes an air metering unit 148 configured to vary a dilution ratio of: the first portion of compressed air entering the primary zone of the combustor 144 to the second portion of compressed air entering the dilution zone of the combustor 144.

In one implementation, the air metering unit 148 includes a sleeve 150 configured to slide over a range of positions along the combustor 144, such as including: a 1:0 dilution ratio position in which the sleeve 150 fully exposes the first set of perforations and fully encloses the second set of perforations in the combustor 144; a 2:1 dilution ratio position in which the sleeve 150 predominantly exposes the first set of perforations and predominantly encloses the second set of perforations in the combustor 144; a 1:1 dilution ratio position in which the sleeve 150 similarly exposes the first and second sets of perforations in the combustor 144; and a 1:2 dilution ratio position in which the sleeve 150 predominantly encloses the first set of perforations and predominantly exposes the second set of perforations in the combustor 144.

In this variation of the example implementation, the air metering unit 148 can also include an actuator 152 configured to transition the sleeve 150 along this range of positions. Thus, during operation, the controller 180 can set a target exhaust gas temperature, such as described below, detect a temperature of the exhaust gases 220 exiting the nozzle 160, and implement closed-loop controls to: adjust the air metering unit 148 to increase the dilution ratio—and increase the fuel flow rate accordingly to maintain a target air-fuel ratio—if the temperature of the exhaust gases 220 is less than the target temperature; and adjust the air metering unit 148 to decrease the dilution ratio—and decrease the fuel flow rate accordingly to maintain the target air-fuel ratio—if the temperature of the exhaust gases 220 is more than the target temperature.

Generally, the controller 180 can: set a target exhaust gas temperature based on nominal bore geologies or based on real-time boring characteristics; and then implement closed-loop controls to adjust fuel flow rate and/or dilution ratio within the combustor 144 based on a difference between the measured and target temperatures of exhaust gases 220 exiting the nozzle 160.

Additionally, as shown in FIG. 6, the system 100 can also include an afterburner 158 configured to inject fuel into exhaust gases 220 exiting the turbine 154 in order to rapidly increase temperature and pressure of exhaust gases reaching the bore face 200. The controller 180 can be configured to: selectively actuate the afterburner 158 (through ignition and control of fuel flow rate) to rapidly increase the temperature of the exhaust gases 220 and the pressure of the exhaust gases 220 impinging upon the bore face 200. In use, the afterburner 158 can define a recirculation zone proximate its terminus to anchor the afterburner flame. The afterburner 158 can further include a spark plug, glow plug, or other electrical or electromagnetic starter to ignite the afterburner flame and initialize vaporization of the injected fuel. In another variation of the example implementation, when adjusting the temperature and/or pressure of the exhaust gases 220 upon the bore face 200, the controller 180 can be configured to: first adjust an activation and/or fuel flow rate to the afterburner 158; then if necessary adjust a fuel flow rate or dilution rate through methods and techniques described above.

In one variation of the example implementation, the afterburner 158 can be fed with fuel from the primary fuel supply line, for example liquid diesel fuel. Alternatively, the afterburner 158 can be fed by a separate fuel line and with a separate type of fuel (e.g., a mixture of kerosene and gasoline, biodiesel, etcetera). Moreover, the controller 180 can: selectively increase or decrease a nozzle area of a variable area nozzle 160 in coordination with actuation of the afterburner 158 in order to maintain consistent pressure within the nozzle 160.

In another variation of the example implementation, the system 100 further includes: a compressor tap (not shown) arranged between the compressor 142 and the combustor 144; and a low-temperature jet coupled to the compressor tap, arranged near the bore face 200, and configured to blow spall—removed from the bore face 200 by high-temperature exhaust gases output from the nozzle 160—away from the bore face 200 and rearward behind the cutterhead 140.

For example, the low-temperature jet can be arranged below the nozzle 160 and can face downwardly and/or toward a bottom corner of the bore face 200 such that compressed air discharged by the low-temperature jet displaces spall—falling from the bore face and collecting in this bottom corner of the bore face—rearward, thereby exposing the bottom of the bore face 200 to spallation by exhaust gases 220 discharged from the nozzle 160. The system 100 can thus: bleed a third portion of compressed air from the output of the compressor 142 via the compressor tap and feed this compressed air to the low-temperature jet; blast this third portion of compressed air toward the bottom region of the bore face 200; draw spall and larger rock fragments—that may otherwise collect along the bottom of the bore face 200—rearward; and thus expose the bottom corner of the bore face 200 to the nozzle 160 for further spallation.

Additionally or alternatively, in this variation, the system 100 can include a set of low-temperature jets arranged about the outer casing of the cutterhead 140 near the nozzle 160, facing reward on the cutterhead (i.e., opposite the bore face), and connected to the compressor tap. In this implementation, the set of low-temperature jets can direct low-temperature air along the outer casing of the cutterhead 140 in order to form a cool boundary layer along the chassis 110, which may thermally shield the chassis 110 from hot exhaust gases and spall moving off of the bore face 200 and flowing around the cutterhead 140 during operation.

In another variation, the system 100 further includes a fan: arranged inline and ahead of the compressor 142; coupled to the air supply line; driven by the turbine 154 (e.g., in a high-bypass fan configuration); and configured to output a second stream of low-temperature compressed air separate from the compressor 142, the combustor 144, and the nozzle 160. In this variation, the system 100 can also include a flow reversal subsystem (e.g., in a clamshell configuration) configured to direct this second stream of low-temperature compressed air rearward and away from the bore face 200 to draw spall —moving off of the bore face 200—away from the bore face, past the cutterhead 140, and out of the tunnel. For example, the flow reversal subsystem can: direct the second stream of low-temperature compressed air rearward (i.e., away from the bore face 200; opposite the direction of air flowing from the air supply into the cutterhead 140); thus creating a lower-pressure region between the rear of the cutterhead 140 and the bore face 200 in order to increase flow rate of exhaust gases 220 and spall around and past the cutterhead; and cool the chassis 110 of the system 100.

As shown in FIGS. 2 and 6, the cutterhead 140 can be mounted on the chassis 110, and the propulsion system 120 can advance the chassis 110 and the cutterhead 140 forward toward the newly exposed surface of the bore face 200 as the system 100 bores the tunnel.

For example, the chassis 110 and the propulsion system 120 can form a wheeled or tracked cart driven by electric, hydraulic, or pneumatic motors powered via a generator, pump, or compressed air tap, etc. connected to the cutterhead 140. The chassis 110 can also include a cutterhead ram 170 configured to move the cutterhead 140 in at least five degrees of freedom. The cutterhead ram 170 can be configured: to locate the cutterhead 140 on the chassis 110; to advance and retract the cutterhead 140 longitudinally (e.g., along an X-axis) along the chassis 110 in order to maintain a standoff distance between the nozzle 160 and the bore face 200; to pitch and yaw the cutterhead 140 on the chassis 110 (e.g., by up to +/−10° in pitch and yaw) in order to scan (or "raster") the jet impingement area across the bore face 200; and/or to lift or surge the cutterhead 140 vertically along a Z-axis and shift or heave the cutterhead 140 laterally along a Y-axis on the chassis 110 in order to scan the jet impingement area across the bore face 200.

In this example implementation, the controller 180 can implement one or more closed-loop controls to: fully retract the cutterhead ram 170; advance the propulsion system 120 forward to locate the nozzle 160 at (approximately) a target standoff distance from the bore face 200; raster the nozzle 160 across the bore face 200 in order to spall and remove the rock over a bore face area larger than the jet impingement area and the cross-section of the system 100; selectively pause (or "dwell") the nozzle 160 to locate the jet impingement area at a low boring rate region of the bore face 200; and advance the cutterhead ram 170 forward according to a removal rate calculated during this raster cycle.

The controller 180 can repeat the closed-loop process over multiple raster cycles until the cutterhead ram 170 reaches the apex of its forward travel, at which time the controller 180 can fully retract the cutterhead ram 170 and advance the propulsion system 120 forward to locate the nozzle 160 at (approximately) the target standoff distance from the bore face 200 before repeating this process. Furthermore, in this example, the controller 180 can: maintain a consistent fuel flow rate through the combustor 144 and/or afterburner 158 and thus maintain a consistent temperature and pressure of exhaust gases 220 exiting the nozzle; and modulate a scan rate through which the system 100 rasters the nozzle 160 across the bore face 200 in order to achieve a target bore size (e.g., width and height) and a target bore profile (e.g., a D-shape) over the length of the bore.

CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the disclosure without departing from the scope of this disclosure as defined in the following claims.

The invention claimed is:

1. A boring system for removing material from a bore face, the boring system comprising:

a cutterhead comprising:

a compressor configured to compress air, a combustor configured to generate an exhaust, a turbine configured to extract energy from the exhaust, and an afterburner connected to the turbine and configured to direct the exhaust to the bore face; and a controller connected to the cutterhead and configured to control operations of one or more of the compressor, the combustor, the turbine, or the afterburner.

2. The boring system of claim 1, wherein the afterburner is configured to increase a temperature of the exhaust prior to directing the exhaust to the bore face.

3. The boring system of claim 2, wherein the controller is configured to track the temperature of the exhaust and to regulate an additional fuel entering the afterburner based on the temperature of the exhaust.

4. The boring system of claim 3, wherein the controller is configured to control at least one characteristic selected from the group consisting of:

flame ignition in the afterburner; and a dilution rate of the additional fuel entering the afterburner.

5. The boring system of claim 1, wherein the cutterhead comprises a variable-area nozzle comprising a variable aperture.

6. The boring system of claim 5, wherein the controller is configured to control a nozzle area of the variable aperture thereby controlling a jet impingement area at the bore face.

7. The boring system of claim 1, further comprising a depth sensor connected to the controller and configured to detect a standoff distance between the cutterhead and the bore face.

8. The boring system of claim 7, wherein the depth sensor comprises a contact probe and a linear actuator configured to extend the contact probe toward the bore face and to retract the contact probe from the bore face.

9. The boring system of claim 8, wherein the controller is configured to:

direct the linear actuator to extend the contact probe toward the bore face;

read a length measurement from the depth sensor once resistance on the linear actuator reaches a threshold resistance; and direct the linear actuator to retract the contact probe from the bore face.

10. The boring system of claim 7, wherein the controller is configured to:

receive a first standoff distance from the depth sensor at a first time;

receive a second standoff distance from the depth sensor at a second time; and calculate a current boring rate at the bore face based on a difference between the first standoff distance and the second standoff distance over an interval between the first time and the second time.

11. The boring system of claim 1, further comprising:

a thermally-shielded sensor housing comprising an opening;

a thermally-shielded shutter arranged across the opening of the thermally-shielded sensor housing; and a sensor arranged in the thermally-shielded sensor housing behind the thermally-shielded shutter.

12. The boring system of claim 11, wherein the sensor is selected from the group consisting of a radar-based depth sensor, an infrared sensor, an ultrasonic sensor, a laser sensor, a 2D depth camera, a 3D LIDAR camera, and a temperature sensor.

13. The boring system of claim 1, further comprising:

a temperature sensor connected to the controller and configured to determine a temperature of the exhaust; and a fuel metering unit connected to the controller and configured to adjust a flow rate of an additional fuel injected into the afterburner, wherein the controller is configured to control the flow rate set by the fuel metering unit based on the temperature of the exhaust determined by the temperature sensor.

14. The boring system of claim 1, wherein:

the combustor is configured to receive fuel to generate the exhaust, and the afterburner is configured to receive additional fuel to increase a temperature of the exhaust prior to directing the exhaust at the bore face.

15. The boring system of claim 14, wherein the additional fuel received by the afterburner is different from the fuel received by the combustor.

16. The boring system of claim 14, wherein the additional fuel received by the afterburner is liquid diesel fuel.

17. The boring system of claim 1, further comprising a cutterhead ram, wherein:

the cutterhead ram is mechanically connected to the cutterhead and configured to position the cutterhead relative to the bore face, the cutterhead ram is communicatively connected to the controller, and the controller is further configured to instruct the cutterhead ram to position the cutterhead relative to the bore face.

18. The boring system of claim 17, wherein the cutterhead ram is configured to position the cutterhead relative to the bore face by adjusting one or both of a pitch or a yaw of the cutterhead.

19. The boring system of claim 1, further comprising an optical sensor connected to the controller and directed toward the bore face and configured to output images of the bore face, wherein the controller is configured to:

set a target exhaust gas temperature;

receive an image of the bore face captured by the optical sensor;

scan the image of the bore face to detect a set of pixels indicative of molten material; and based on detecting the set of pixels indicative of molten material, reduce the target exhaust gas temperature.

20. The boring system of claim 17, further comprising:

a chassis supporting the cutterhead ram; and a propulsion system configured to advance the chassis in a first direction toward the bore face and retract the chassis in a second direction away from the bore face thereby changing the position of the cutterhead relative to the bore face.

* * * * *